United States Patent
Balasubramanian et al.

(10) Patent No.: US 9,980,209 B2
(45) Date of Patent: May 22, 2018

(54) EFFICIENT FREQUENCY ASSIGNMENT FOR MOBILE DEVICES IN COEXISTING WIRELESS COMMUNICATION SYSTEMS

(71) Applicant: QUALCOMM Incorporated, San Diego, CA (US)

(72) Inventors: Srinivasan Balasubramanian, San Diego, CA (US); Jen Mei Chen, San Diego, CA (US); Manoj M. Deshpande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 14/217,914

(22) Filed: Mar. 18, 2014

(65) Prior Publication Data
US 2014/0213247 A1    Jul. 31, 2014

Related U.S. Application Data

(63) Continuation of application No. 12/392,930, filed on Feb. 25, 2009, now Pat. No. 8,682,332.
(Continued)

(51) Int. Cl.
*H04W 4/00* (2018.01)
*H04W 48/16* (2009.01)
(Continued)

(52) U.S. Cl.
CPC ............ *H04W 48/16* (2013.01); *H04W 8/02* (2013.01); *H04W 8/005* (2013.01); *H04W 16/16* (2013.01);
(Continued)

(58) Field of Classification Search
CPC ..... H04W 8/183; H04W 36/30; H04W 48/16; H04W 48/20; H04W 52/24; H04W 56/00;
(Continued)

(56) References Cited

U.S. PATENT DOCUMENTS 6,529,491 B1 * 3/2003 Chang ................. H04W 48/18
370/335
2004/0203747 A1   10/2004 Uchida
(Continued)

FOREIGN PATENT DOCUMENTS

CN    1235443 A    11/1999
CN    1427566 A    7/2003
(Continued)

OTHER PUBLICATIONS

Balasubramanian S et al., "Femto Cells-Search and System Selection", 3GPP2,S00-FEMTO-20071015-024, Oct. 15, 2007.
(Continued)

*Primary Examiner* — Jinsong Hu
*Assistant Examiner* — Alexander Yi
(74) *Attorney, Agent, or Firm* — Muncy, Geissler, Olds & Lowe, P.C.

(57) ABSTRACT

Efficient frequency assignment for mobile terminals in coexisting wireless communication systems is described herein. The coexisting wireless communication systems comprise a macro communication system and a localized communication system. Two prioritized lists are defined, a first list comprising a first entry relating to the macro communication system and the second entry relating to the localized communication system, the first and second entries each listing at least one common frequency. Based on the first list, a mobile terminal uses communication protocols associated with the localized communication system.

16 Claims, 14 Drawing Sheets

Related U.S. Application Data

(60) Provisional application No. 61/031,646, filed on Feb. 26, 2008.

(51) Int. Cl.
  *H04W 8/02* (2009.01)
  *H04W 8/00* (2009.01)
  *H04W 16/16* (2009.01)
  *H04W 48/18* (2009.01)
  *H04W 72/00* (2009.01)
  *H04W 72/04* (2009.01)

(52) U.S. Cl.
  CPC ............ *H04W 48/18* (2013.01); *H04W 72/00* (2013.01); *H04W 72/0453* (2013.01)

(58) Field of Classification Search
  CPC ..... H04W 88/02; H04W 88/06; H04W 92/02; H04W 60/00; H04W 48/18; H04W 72/04; H04W 64/00; H04W 84/18; H04W 80/04; H04W 28/04; H04W 84/12; H04M 1/72519; H04Q 11/0478; H04L 2012/5667; H04L 29/06027; H04L 29/06; H04L 29/08072; H04N 5/232; H04N 5/23206; H04N 2101/00
  USPC ............ 455/432.1, 436, 434, 525, 522, 502, 455/422.1, 552.1, 432.2, 435.1, 435.2, 455/450, 550.1, 456.1; 370/310, 331, 370/395.2, 395.52, 328, 329, 338, 352; 709/220, 224, 227; 348/211.2, 211.3, 348/207.2
  See application file for complete search history.

(56) References Cited

U.S. PATENT DOCUMENTS

| | | | |
|---|---|---|---|
| 2006/0250935 A1* | 11/2006 | Hamamoto | H04L 5/0032 370/203 |
| 2006/0282554 A1 | 12/2006 | Jiang et al. | |
| 2007/0183427 A1 | 8/2007 | Nylander et al. | |
| 2007/0191005 A1 | 8/2007 | Cooper et al. | |
| 2007/0225029 A1 | 9/2007 | Abusch-Magder | |
| 2007/0270152 A1 | 11/2007 | Nylander et al. | |
| 2009/0052395 A1* | 2/2009 | Bao | H04W 48/12 370/331 |
| 2009/0092080 A1* | 4/2009 | Balasubramanian | H04J 11/0093 370/328 |
| 2009/0215452 A1 | 8/2009 | Balasubramanian et al. | |

FOREIGN PATENT DOCUMENTS

| | | |
|---|---|---|
| EP | 1313338 A1 | 5/2003 |
| JP | H04003535 | 1/1992 |
| JP | H10190553 A | 7/1998 |
| JP | 2006049972 A | 2/2006 |
| WO | 9914974 A1 | 3/1999 |

OTHER PUBLICATIONS

Fan et al., "Interference Management in Femto Cell Deployment", 3GPP2, S00-FEMTO-20071015-025_QCOM Femto Interference Management, Oct. 15, 2007.

International Search Report and Written Opinion—PCT/US2009/035342—ISA/EPO—dated Oct. 26, 2009.

Qualcomm Europe: "Measurement and mobility issues for home (e)Node Bs" 3GPP Draft; R2-074117, 3rd Generation Partnership Project (3GPP), Mobile Competence Centre ; 650, Route des Lucioles ; F-06921 Sophia-Antipolis Cedex; France, vol. RAN WG2, No. Shanghai, China; 20071008, Oct. 1, 2007 (Oct. 1, 2007), XP050136747 the whole document.

Taiwan Search Report—TW098106202—TIPO—dated Aug. 22, 2013.

Ch'ng B., et al., "Femto Access Control Provisioning and Enhanced System Selection," S00-FEMTO-20071015-019, 3GPP2, Oct. 15, 2007.

Ch'ng B., et al., "Femto Related Provisioning Enhancements for Enhanced System Selection (ESS) for Femto Cells", C14-20071203-009, 3GPP2, Dec. 1 2007.

\* cited by examiner

|   | Frequency | SID/NID | Priority |
|---|---|---|---|
| 1 | F5 | $SID_F / NID_F$ | 1 |
| 2 | F5 | $SID_M/NID_{M2}$ | 2 |
| 3 | F1, F2, F3, F4 | $SID_M/NID_{M1}$ | 3 |

FIG. 8a

| Frequency | SID/NID | Priority |
|---|---|---|
| F1, F2, F3, F4 | $SID_M/NID_{M1}$ | 1 |

FIG. 8b

EFFICIENT FREQUENCY ASSIGNMENT FOR MOBILE DEVICES IN COEXISTING WIRELESS COMMUNICATION SYSTEMS

CROSS-REFERENCE TO RELATED APPLICATION

This application is a continuation of U.S. application Ser. No. 12/392,930, filed Feb. 25, 2009, which claims priority under 35 U. S. C. § 119 (e) from U.S. Provisional Patent Application No. 61/031,646, filed Feb. 26, 2008, entitled "OPTIMIZED PREFERRED ROAMING LIST (PRL) BASED APPROACH FOR FEMTO CELL SYSTEM SELECTION" which are hereby incorporated by reference in their entirety.

BACKGROUND

Field

The present application relates generally to wireless communications, and more specifically to methods and systems for efficient frequency assignment for mobile devices in coexisting wireless communication systems.

Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

In recent years, users have started to replace fixed line communications with mobile communications and have increasingly demanded great voice quality, reliable service, and low prices.

In addition to mobile phone networks currently in place, a new class of small base stations has emerged, which may be installed in a user's home and provide indoor wireless coverage to mobile units using existing broadband Internet connections. Such personal miniature base stations are generally known as localized communication systems, access point base stations, Home Node B's (HNB's), or femtocells. Typically, such miniature base stations are connected to the Internet and the mobile operator's network via DSL router or cable modem.

A prioritized list such as a Preferred Roaming List (PRL) is a database residing within many wireless devices, such as cellphones, that contains information used during the process of system selection and acquisition. In the case of RUIM-based CDMA devices, the PRL resides on the RUIM. The PRL indicates which bands, sub bands and service provider identifiers will be scanned and in what priority order. Without a PRL, the device may not be able to roam, i.e. obtain service outside of the home area. There may be cases where missing or corrupt PRL's can lead to a customer not having service at all.

On many networks, regularly updating the PRL is advised if the subscriber uses the device outside the home area frequently, particularly if they do so in multiple different areas. This allows the phone to choose the best roaming carriers, particularly "roaming partners" with whom the home carrier has a cost-saving roaming agreement, rather than using non-affiliated carriers. PRL files can also be used to identify home networks along with roaming partners, thus making the PRL an actual list that determines the total coverage of the subscriber, both home and roaming coverage.

The PRL is built by an operator and is normally not accessible to the user. Many operators provide the ability for the user to download the latest PRL to their device by dialing the Over-the-air (OTA) feature code *228.

A typical PRL structure consists of an acquisition table and a system table (along with some header and overhead information). The acquisition table comprises an indexed list of frequencies on which the device may search for particular systems. The idea behind the acquisition table is to optimize the acquisition time by identifying only the frequencies that should be searched, rather than searching the entire frequency spectrum. The information contained in each acquisition table entry includes an index, the network type, and associated channel blocks.

The system table generally comprises a prioritized list of systems that the device is permitted to access (Preferred Systems) and those that it is explicitly forbidden to access (Negative Systems). Note that it is also possible to indicate forbidden systems using a separate system identification number/network identification number (SID/NID) Lockout List in the handset; however, this is not a recommended approach as it creates control over system selection outside of the PRL.

Each system table entry belongs to a geographic area known as a GEO. These GEOs are listed in priority order. Each IS-95/1xRTT system is identified by either SID/NID or, in the case of enhanced PRL, SID/NID or MCC/MNC. To support 1xEV-DO systems, the PRL must be IS-683-C or later. Each 1xEV-DO system is identified by a Subnet ID. For hybrid mode operation (i.e. IS-95/1xRTT and 1xEV-DO), association tags are used link an IS-95/1xRTT system with one or more 1xEV-DO systems. Hybrid systems always attempt to select an IS-95/1xRTT system first, then use the association tag to attempt to select an associated 1xEV-DO system.

Each entry also provides an acquisition table index where the frequencies associated with that system are identified and a roaming indicator that dictates what type of indication should be displayed to the user when they are receiving service from that system.

The PRL typically operates in one of two modes, a restrictive mode or a permissive mode, dictated by a Preferred Only indicator. In the restrictive mode, otherwise known as the closed PRL or Preferred Only Mode, the device will only acquire systems identified as preferred in the PRL system table. While this mode of operation gives operators the most control over the system selection process, it requires that PRLs be kept up-to-date to ensure that newly added roaming partners can be selected. Note that even if a PRL is restrictive according to the preferred only indicator, the use of wildcard SID/NID or MCC/MNC values as preferred systems would essentially make the PRL permissive because wildcards match any system that is located.

In the permissive mode, otherwise known as the open PRL or Not Preferred Mode, the device will attempt to acquire preferred systems. However, if no preferred systems can be located, the device may select systems that are not listed in the PRL system table. It still will not select negative systems; but, if no preferred systems can be found and an unknown system is available, it will select the unknown system. While this mode of operation is easier to maintain because new partners can be chosen even if they are not explicitly listed in the PRL, it carries with it the danger of allowing the mobile device to become camped onto a system that will not provide it with service. Further information on PRL is defined by OTASP specification TIA-683, available from the 3GPP2 website as C.S0016.

Prior mechanisms used for a UE to access femtocells include using beacons deployed on all macro carriers (i.e., carrier signals emanating from cellular communication systems), a PRL mechanism within the UE that lists the femtocell as the most preferred system with all the macro channels treated as equal, or using the macro system to send one or more SRDMs (redirection messages) to move the mobile to a femto-channel associated with a femtocell.

One shortcoming of the aforementioned methods to access femtocells is that a significant amount of power may be consumed by a UE attempting to locate and connect with a femtocell. Therefore, there is a need to enable UEs to locate and connect to femtocells while minimizing power requirements to do so.

BRIEF DESCRIPTION OF THE DRAWINGS

FIG. 8a illustrates a first simplified prioritized list;

FIG. 8b illustrates a second simplified prioritized list;

SUMMARY

Figure 1:
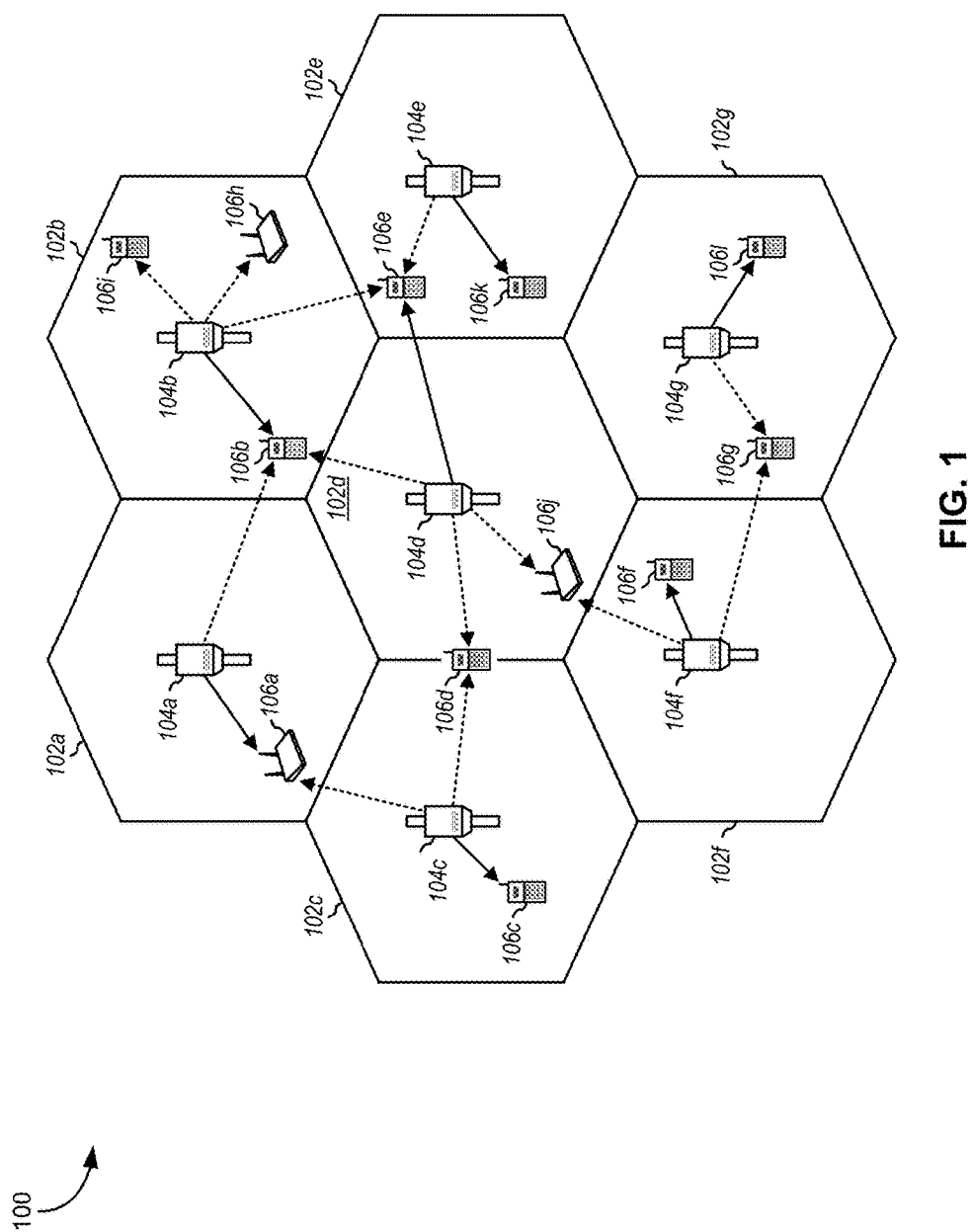
FIG. 1 illustrates an exemplary wireless communication system.

Methods and apparatus are described for efficient frequency assignment for wireless devices in coexisting communication systems, such as in a macro communication system and a localized communication system. In one embodiment, a method is described comprising receiving a prioritized list of related frequency and network identification information, the prioritized list comprising at least two entries; a first entry relating to a macro communication system and the second entry relating to a localized communication system, the first and second entries each listing at least one common frequency. Next, one or more searches for the localized communication system is conducted using the common frequency while using the common frequency to communicate with the macro communication system. Next, the localized communication system is used for communications on the common frequency when the localized communication system is determined to be in range.

In another embodiment, a method is described for efficient frequency assignment for mobile terminals in coexisting communication systems comprising defining a common frequency to be used by a first macro communication system and a localized communication system. Further, a first prioritized list of related frequency and network identification information is generated, the first prioritized list comprising at least two entries, a first entry relating to the macro communication system and the second entry relating to the localized communication system, the first and second entries each listing the common frequency. A second prioritized list of related frequency and network identification information is generated, the second prioritized list comprising at least one entry relating to the macro communication system and no entries relating to the localized communication system. Finally, the first prioritized list is provided to a first mobile terminal authorized to communicate using either the macro communication system or the localized communication system, and the second prioritized list is provided to a second mobile terminal, the second mobile terminal not authorized to communicate using the localized communication system.

In yet another embodiment, a method is described, comprising engaging in an active communication by a mobile device with a macro communication system using a first frequency that is common to both the macro communication system and a localized communication system. Then, if interference from the localized communication system is greater than a predetermined threshold, instructions are received to transfer the active communication to a second frequency based on the interference level exceeding the predetermined threshold.

Various apparatus are also described which implements the aforementioned methods.

DETAILED DESCRIPTION

The word "exemplary" is used herein to mean "serving as an example, instance, or illustration." Any embodiment described herein as "exemplary" is not necessarily to be construed as preferred or advantageous over other embodiments. The disclosed embodiments may be applied to any one or combinations of the following technologies: Code Division Multiple Access (CDMA) systems, Multiple-Carrier CDMA (MC-CDMA), Wideband CDMA (W-CDMA), High-Speed Packet Access (HSPA, HSPA+), Time Division Multiple Access (TDMA) systems, Frequency Division Multiple Access (FDMA) systems, Orthogonal Frequency Division Multiple Access (OFDMA) systems, or other multiple access techniques. A wireless communication system may be designed to implement one or more standards, such as IS-95, cdma2000, IS-856, W-CDMA, TD-SCDMA, and other standards.

In embodiments described in detail below, a macro cellular network is enabled to build a required prioritized list or preferred roaming list (PRL) based on an International Mobile Subscriber ID (IMSI) of the primary household member with and without storing it in a separate database. As the macro network changes, updated PRL configurations are pushed to the femto UE. Since these are dedicated PRL configurations, the GEO table can be structured to be as small as possible also. Thus, the existing PRL update mechanisms can be relied upon. The access point base station or femtocell does not need to be involved. In addition, these embodiments avoid storing information within the database and allow for the PRL to be derived based on the identification of the primary household member. The derived key associated with the primary household member is retained to address the scenario when the primary household member moves and the same key is further reassigned to another member in the household.

Throughout this specification, the terms "network" and "sub-network" are used interchangeably and represent a communication system in the former and a sub-set of the communication system in the latter.

FIG. 1 illustrates an exemplary wireless communication system 100 configured to support a number of users, in which various disclosed embodiments and aspects may be implemented. The wireless communication system 100 is referred to herein a macro communication system, macro network, or simply macro and simply refers generally to any cellular-based wireless communication system.

As shown in FIG. 1, by way of example, macro cell mobile network 100 provides communication for multiple cells 102, such as, for example, macro cells 102a-102g, with each cell being serviced by a corresponding access point (AP) 104 (such as APs 104a-104g). Each cell may be further divided into one or more sectors. Various access terminals (ATs) 106, including ATs 106a-106k, also known interchangeably as user equipment (UE), mobile terminals, or mobile devices, are dispersed throughout the system. Each AT 106 may communicate with one or more APs 104 on a forward link (FL) and/or a reverse link (RL) at a given moment, depending upon whether the AT is active and whether it is in soft handoff, for example. The macro cell mobile network 100 may provide service over a large geographic region, for example, macro cells 102a-102g may cover a few blocks in a neighborhood.

Figure 2:
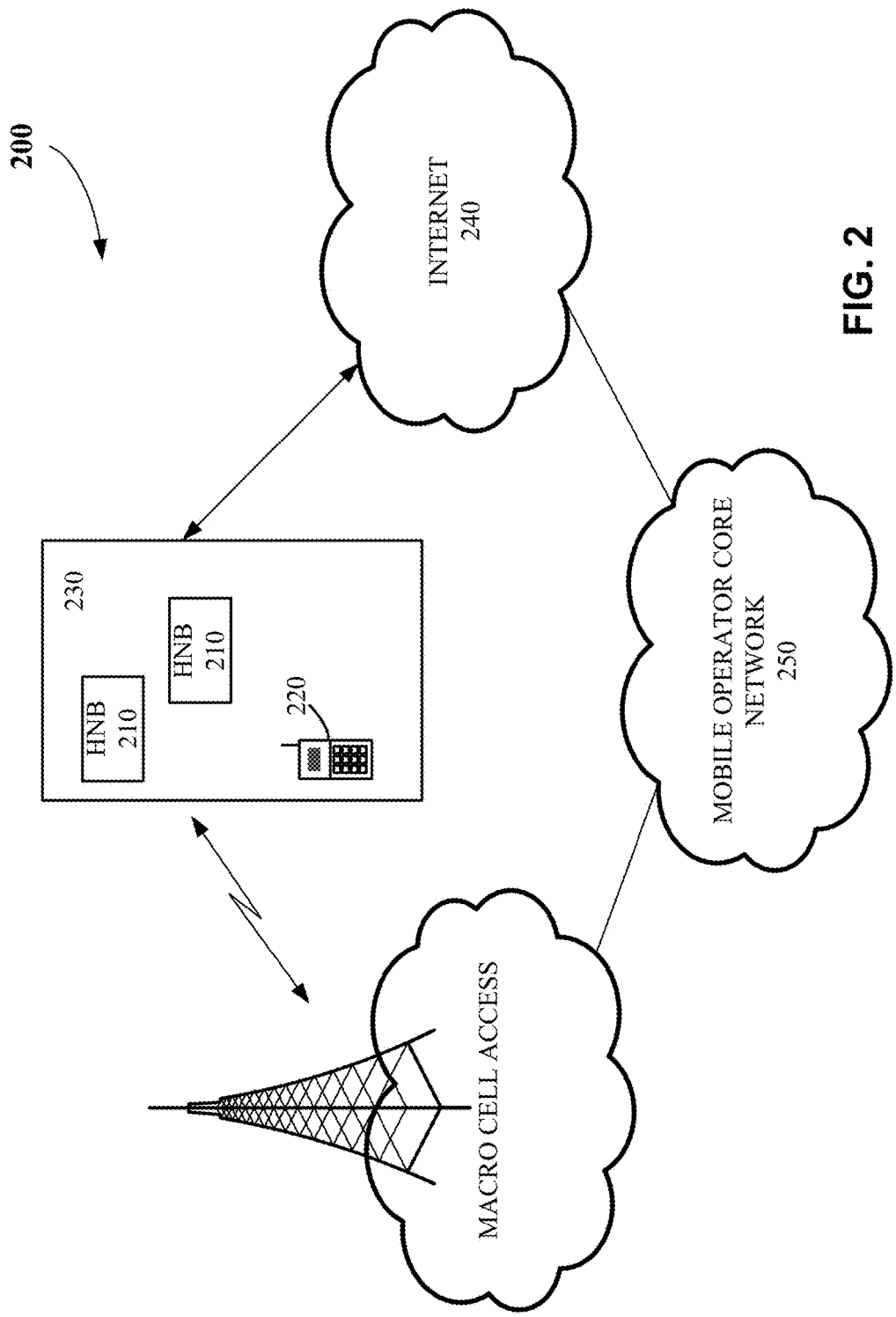
FIG. 2 illustrates an exemplary communication system to enable deployment of access point base stations within a network environment.

FIG. 2 illustrates an exemplary localized communication system 200 coexisting with the communication system of FIG. 1. In other words, the coverage areas of communication system 100 and communication system 200 overlap to some degree. The localized communication system 200 employs access point base stations, otherwise known as Home Node B units (HNBs), or femtocells, within a network environment that provide limited range communications for mobile devices operating in proximity to a femtocell. As shown in FIG. 2, the system 200 may include multiple access point base stations, or Home Node B units (HNBs), such as, for example, HNBs 210, each being installed in a corresponding small scale network environment, such as, for example, in one or more user residences 230, and being configured to serve associated, as well as alien, user equipment (UE) 220. Each HNB 210 is generally coupled to the Internet 240 and a mobile operator core network 250 via a DSL router (not shown) or, alternatively, a cable modem (not shown). The system 200 is referred to herein as a localized communication system or network, because it generally does not provide a large coverage area, especially when compared to the macro cell mobile network 100.

Although embodiments described herein use 3GPP terminology, it is to be understood that the embodiments may be applied to 3GPP2 (1xRTT, 1xEV-DO Rel0, RevA, RevB) technology and other known and related technologies. In such embodiments described herein, the owner of the HNB 210 subscribes to a mobile service, such as a 3G mobile service, offered through the mobile operator core network 250. The UE 220 is generally capable of operating in both a macro cellular environment and in a residential small scale network environment. Thus, the HNB 210 is generally backward compatible with any existing UE 220.

A femto UE 220 is defined as a mobile device, or UE, that is capable of operating with the macro cell mobile network 100 or a femtocell 210, based on software upgrades or through general provisioning. In one embodiment, a femto UE 220 operates on the macro cellular network 100 and, with several available frequencies to choose from, will monitor a frequency to which it has been assigned by, typically, a hashing function. While monitoring and/or using the assigned frequency, a femto UE (or UE's in general) typically perform a search for other, more desirable systems using, for example, a technique known in the art as BSR. The BSR technique is used every so often (typically in terms of minutes) to search for other, more desirable communication networks (including femtocells) by searching frequencies other than the one that is it currently monitoring. This is generally a power-consuming process. It would be advantageous to avoid off-frequency searching for femtocells in range of a mobile device.

With the above in mind, an operator of the macro communication system 100 may choose to assign one or more frequencies to be a shared frequency between system 100 and system 200. What this means for a mobile device having dual-system communication provisioning is that if the mobile device is monitoring the shared frequency in a macro mode of communications, it does not have to go "off frequency" to find a femtocell, thereby saving power and computational resources of the mobile device.

One issue that will confront a system operator desiring to use the shared frequency technique discussed above is that the system operator may want to restrict some mobile devices from being able to access one or more femtocells. One way to do this is to assign different prioritized lists of available networks and/or sub-networks to each mobile device.

Figure 3:
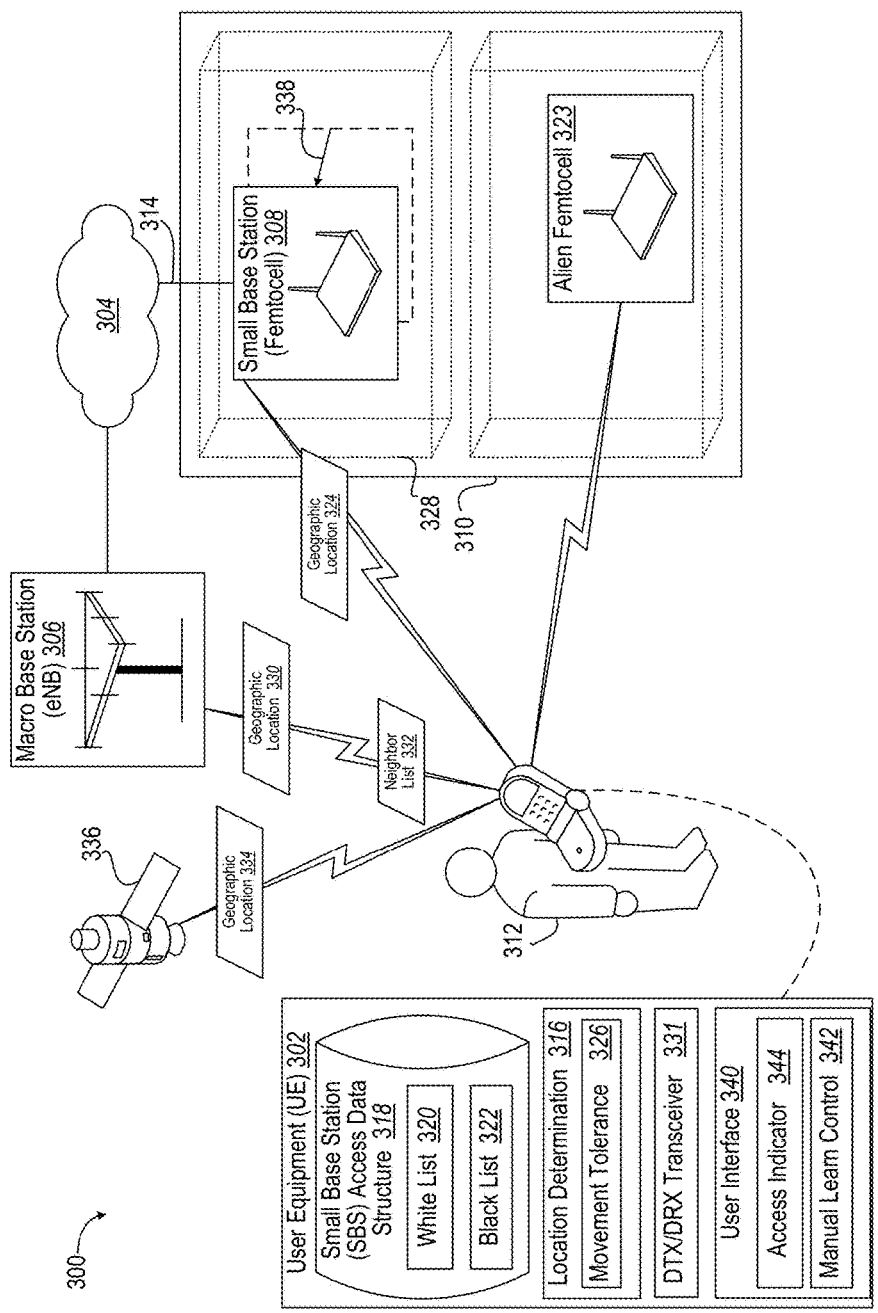
FIG. 3 illustrates a block diagram of a communication system having a mobile station or user equipment for scanning and acquiring a small base station.

In FIG. 3, a communication system 300 enables a femto UE, wireless terminal, wireless device, mobile station, or user equipment (UE) 302 to increase its access to a core network 304 to areas not served by a macro base station (e.g., evolved Base Node (eNB)) 306 by using a localized communication system or small base station (e.g., femtocell) 308. Femtocells can be placed within a structure 310 that degrades reception of the eNB 306. The femtocell as often owned by end user 312 and interface to the core network 304 by a broadband network (e.g., Internet) 314 can provide an economic advantage over usage fee rates for using the eNB 306 as a Radio Access Technology (RAT). Moreover, increasingly users rely upon wireless communication access at their place of employment or at home rather than having a landline telephone or other communication device.

In an illustrative telecommunication system 300, a localized communication system or femtocell 308, originally known as an Access Point Base Station, is a small cellular base station, typically designed for use in residential or small business environments. It connects to the service provider's network via broadband (e.g., Digital Subscriber Line (DSL) or cable); current designs typically support five (5) to one hundred (100) mobile phones in a residential setting. A femtocell allows service providers to extend service coverage indoors, especially where access would otherwise be limited or unavailable. The femtocell incorporates the functionality of a typical base station but extends it to allow a simpler, self contained deployment. An example is a UMTS femtocell containing a Node B, Radio Network Controller (RNC) and GPRS Support Node (SGSN) with Ethernet for backhaul. Although much attention is focused on UMTS, the concept is applicable to all standards, including GSM, CDMA2000, TD-SCDMA and WiMAX solutions. For a mobile operator, the attractions of a femtocell are improvements to both coverage and capacity, especially indoors. There may also be opportunity for new services and reduced cost. The cellular operator also benefits from the improved capacity and coverage but also can reduce both capital expenditure and operating expense. Femtocells are an alternative way to deliver the benefits of Fixed Mobile Convergence (FMC). The distinction is that most FMC architectures require a new (dual-mode) handset which works with existing home/enterprise Wi-Fi access points, while a femtocell-based deployment will work with existing handsets but requires installation of a new access point.

Advantageously, the UE 302 may be provisioned with a location determination component 316 to determine when proximate to the femtocell 308 for which authorization is available for open use. If present, a small base station (SBS) access data structure 318 is updated and referenced to determine if the femtocell 308 is on a "white list" 320 of accessible femtocells or is on a "gray list" of restricted use (e.g., 911 emergency use) 320 or "black list" 322 of being inaccessible, the latter cases depicted by an alien femtocell 323.

UE 302 can identify the associated femtocell 308 by a geographic location message 324 broadcast by the femtocell 308. Advantageously, a movement tolerance component 326 of the UE 302 can identify the associated femtocell 308 even if moved slightly, changing the reported geographic location. In addition, a defined coverage area 328 of the femtocell 308 can be area based or three dimensional (e.g., spherical, polygonal. The SBS access data structure 318 can further support a defined coverage area 328 including vertical portions of a building. Alternatively or in addition to geographic location message 324, UE 302 can receive geographic location 330 from the macro base station (eNB) 306. For instance, the eNB 306 can send a neighbor list 332 that contains white list, gray list or black list information. As another example, the UE 302 can perform location estimates based upon power/direction or triangulation performed based upon one or more eNBs 306. Alternatively or in addition, the UE 302 can receive geographic location 334 based upon reception of global positioning system (GPS) satellites 336.

The UE 302 may extend its battery service life by using DTX/DRX transceiver 331 that discontinuously transmits and receives, supporting improved scan and acquisition of femtocells 308. In addition, this improved scanning and acquisition provides a select-right paradigm of acquiring femtocells, including addressing different usage models, support for multiple femtocells, finding a femto EV-DO system associated with the femto 1× system, acquiring a femtocell when no or limited macro coverage is available, and/or supporting an EV-DO-only femtocell that does not have a 1× system. An SBS access data structure provides a corresponding support. With the provisioned information, procedures in the mobile station (UE) 302 can efficiently select the femtocell 308. In particular, the mobile can learn the white and black list information for femto pilot signals in a network.

In one aspect, detect and break system selection loops executed by the UE 302 are supported to address the issue of femto identification using existing air-interface standards which do not explicitly have 'femto' ID broadcast messages. Such ID information is needed for the UE 302 to determine the identity of the femto 308, 322 and to check if the femto 306, 322 is blacklisted, white-listed, or not appearing in any list. In addition, such aspects address the issue of protecting a mobile-learned femto identity entry or a white list or blacklist entry from over-riding by the network or from deletion by the network.

In one particular aspect, the latitude and longitude information broadcasted by a cell is used to help identify whether the cell is a femtocell (as opposed to a macro-cell 306). Such information could then be stored in the mobile station (MS) or UE 302 so that the next time the UE 302 sees the same femtocell (identified by the latitude and longitude and possibly other information), the 302 may recognize the femtocell (and immediately determine if the femtocell is a valid femtocell or not—based on the stored information in its blacklist/white list, for example. In another aspect, of a mask length is used to help "round out" or roughen the precision of the longitude and latitude information. For example, each could use 24 bits. A mask length could indicate which of the LSB should be ignored. Alternatively, a distance determination can be made from known femtocells with a threshold applied. The need for rounding out is that the femtocell-transmitted longitude and latitude information could change on the order of micrometers, centimeters, etc. (e.g. if a femtocell 308 on table was lightly bumped as depicted at 338). In an illustrative aspect, the femtocell 308 has GPS capability and had such GPS information broadcasted by the femtocell 308. Such mask at the UE 302 provides a means to help the UE 302 recognize that the femtocell 308 with slightly moved longitude/latitude (lat/long) information is still the same femtocell. In additional aspects, finer identification of a femto-cell 308 (e.g., ideally for unique femtocell identification) are supported by additional femto-cell identifiers.

Further enhancements are provided that supporting manual system selection with human-readable femto identification (e.g., for manual black list/white list management and manual scans/scans for a femto-cell. This is depicted as a user interface 340 of the UE 302 that provides a manual learn control 342 as well as an access indicator 344 that gives feedback as to the type of access (e.g., macro, open femto, restricted, unknown femto requiring authentication codes). Thereby, a mobile handset display control functions are provided that relate to femto access. Version control can be provided for SBS access data structure (e.g., Preferred User Zone List (PUZL) databases). Advantageously, database management can be provided for partitioning contents (e.g., user zones) into two sections with one for network-provisioned information and second for mobile-learned information. Support can also be provided for active call hand-offs.

Figure 4:
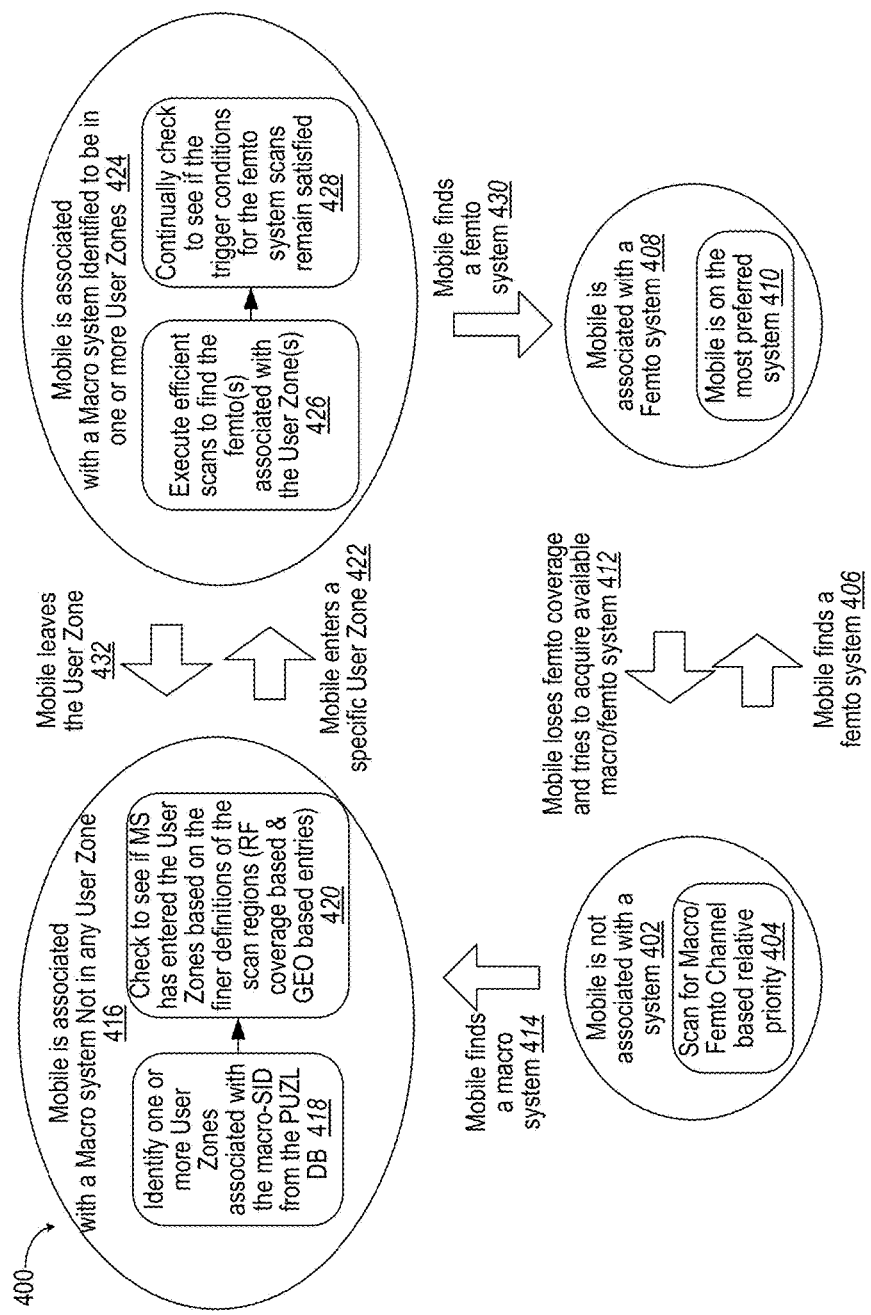
FIG. 4 illustrates a methodology or sequence of operations illustrating some possible states of a femto-enabled mobile station moving into coverage areas of macro systems and various types of small base stations.

FIG. 4 illustrates a methodology or sequence of operations 400 illustrating some possible states of a femto-enabled mobile station or UE moving into coverage areas of macro systems and various types of small base stations (e.g., femtocells). In state 402, the mobile station is not associated with a macro or femto system, and thus performs a scan for a macro/femto channel based upon relative priority (block 404). If the mobile station finds a femto system as depicted at 406, then a state 408 is entered where in the mobile station is associated with a femto system, which in the illustrative depiction is the most preferred system (block 410). If loses the femto coverage as depicted at 412, then the mobile station returns to state 402. Should the mobile then find a macro system based upon relative priority as depicted at 414, then a state 416 is entered wherein the mobile station is associated with a macro system but is not in any user zone. In an exemplary aspect, cost can be decreased by finding an open user zone, so the mobile station continues to identify one or more user zones associated with the macro-SID from the PUZL database (block 418). A check is made to see if the mobile station (MS) has entered the user zone(s) based upon finer definitions of scan regions (e.g., RF coverage based and/or geographic-based entries) (block 420).

If the mobile station enters a specific user zone as depicted at 422, then a state 424 is entered wherein the mobile station is associated with a macro system identified to be in one or more user zones. The mobile station executes power/computation efficient scans to find the femto system(s) associated with the user zone(s) (block 426) and continually checks to see if the trigger conditions for the femto system scans remain satisfied (block 428). For instance, the frequency of checks can be of higher frequency since the mobile station expects to acquire a preferred femto system. By contrast, back at block 420, the checks can be relatively infrequent made in relation to the mobility of the mobile station. If the mobile station finds a femto system as depicted at 430, then state 408 is entered. Otherwise, if the mobile station leaves the user zone as depicted at 432, then state 416 is entered. It also should be appreciated that one or more of the operations described herein may not be employed in a given implementation.

Figure 5:
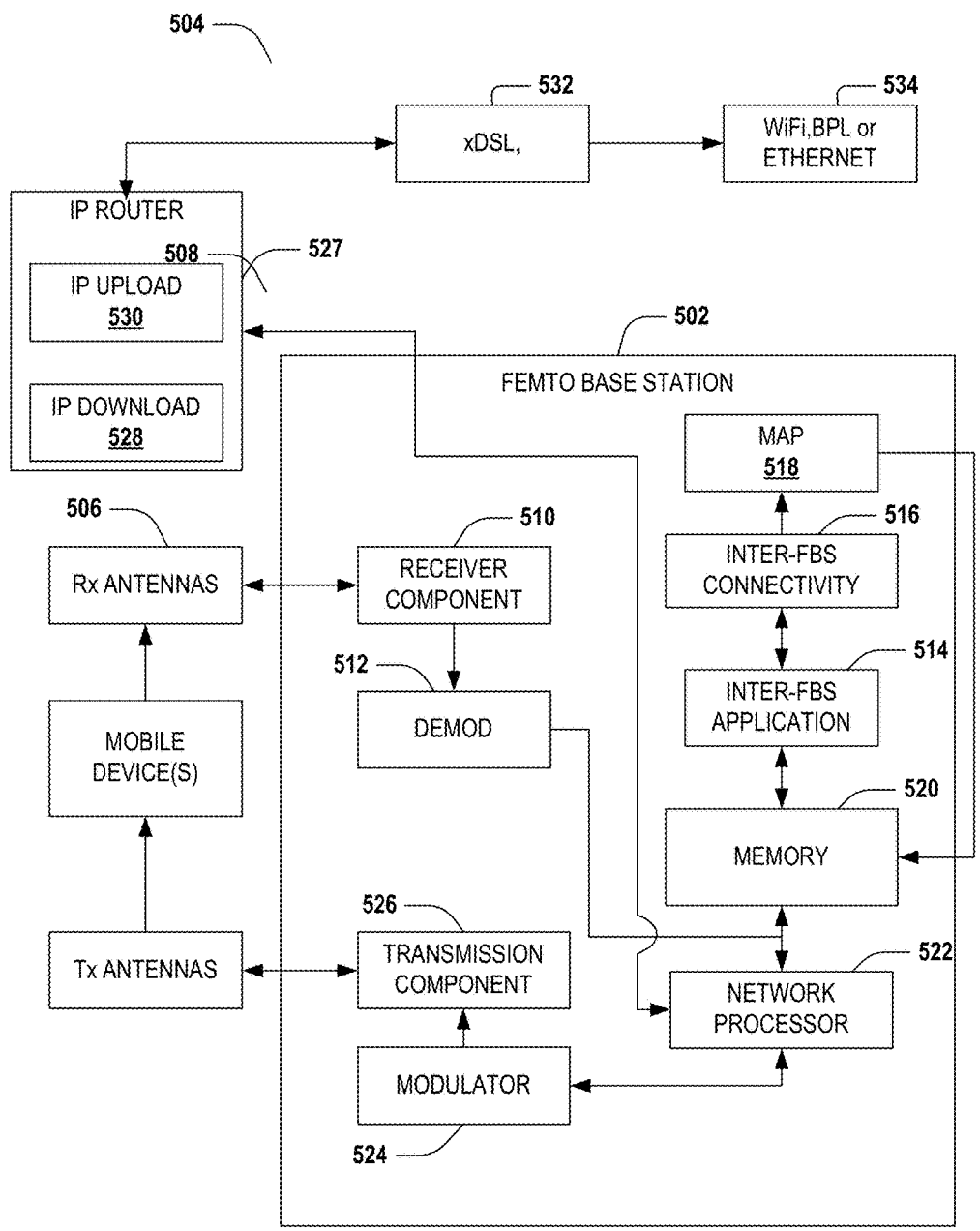
FIG. 5 is an illustration of a system that can interface mobile devices with a cellular network by way of a network of femto base stations.

FIG. 5 is an illustration of a system 500 that can interface mobile devices (504) with a cellular network (not depicted) by way of a network of fBS devices. System 500 includes an fBS 502 (e.g., access point) with a receiver component 510 that receives signal(s) from mobile device(s) 504, or from other fBS devices (not depicted) through one or more receive antennas 506. fBS 502 also includes a transmission component 526 that transmits to the mobile device(s) 504 (or other fBS devices) through one or more transmit antennas 508. Receiver component 510 can receive information from receive antennas 506 and can further comprise a signal recipient (not shown) that receives uplink data transmitted by the mobile devices. It should be appreciated that receiver component 510 and transmission component 526 can both include WLAN, BPL, Ethernet, UMTS TDD, or WLAN over UMTS TDD spectra communication capabilities in order to interact with mobile devices or with other fBS devices.

Receiver component 510 is operatively associated with a demodulator 512 that demodulates received information. Demodulated symbols are analyzed by a network processor 522 that can generate additional signals (e.g., in the form of transmission and/or routing instructions) modulated by modulator 524 and transmitted by transmission component 526. Further, network processor 522 can be coupled to a memory 520. Memory 520 stores information pertinent to effectuating wired and/or wireless communication, application modules (514, 516) for maintaining an fBS network and routing information between fBS devices and/or with connected mobile devices, and/or any other suitable information related to performing the various actions and functions set forth herein (see below).

Network processor 522 can route at least a portion of traffic associated with a communication link between fBS 502 and a mobile device (504) to a neighboring fBS (not depicted) for transfer to a cellular network (e.g., by way of a direct connection to the cellular network, or by way of the Internet). Furthermore, network processor 522 is configured to direct traffic affiliated with the fBS 502 (e.g., generated by a predetermined mobile device or group of mobile devices, for instance) directly to the cellular network by way of an IP upload link 530 (e.g., DSL connection, such as ADSL, VDSL, HDSL etc., cable IP connection, BPL connection). In addition, data can be received from the cellular network via an IP download link 528 (e.g., DSL, cable, BPL) and directed to a mobile device (504) affiliated with the fBS 502.

Memory 520 can contain application modules that generate instructions for forming, maintaining and/or routing data within an fBS network. Specifically, memory 520 can include an inter-fBS application module 514 for directing cellular related traffic between the fBS 502 and a neighboring fBS (not depicted). Additionally, memory 520 can contain an inter-fBS connectivity application that maps connectivity between fBS 502 and the neighboring fBS(s) to compile a connectivity map 518 (e.g., that can be routed to a cellular network RNC for hand-off and multi-hop management). Such a connectivity map 518 can establish contemporaneous propagation, load, QoS or availability parameters, or a combination of these or like parameters, associated with fBS 502 or the neighboring fBS, or both. In addition, varying levels of such parameters associated with both voice or data traffic can be compiled within the connectivity map 518.

In addition to the foregoing, receiver component 510 and transmission component 526 can receive and transmit, respectively, various information to/from a cellular network (e.g., via IP upload 530 and/or IP download 528) or to/from other fBS devices of the fBS network by way of an IP router 527 that communicates over unlicensed frequencies or wired connections (e.g., WLAN router, LAN router, or the like). For example, receiver component 510 can receive an fBS network map from a cellular network RNC that indicates inter-fBS connectivity parameters for each fBS on the fBS network. Such parameters can be utilized to coordinate multi-hop routing of cellular traffic from within the fBS network. Additionally, instructions for such routing or for managing a soft hand-off with mobile device(s) 504 can be received from the RNC. Additionally, inter-fBS connectivity parameters can be received from other fBS devices themselves (e.g., because of a broadcast transmission query generated by network processor 522 and transmitted by transmission component 526). In such a case, inter-fBS connectivity application 516 can include connectivity parameters associated with other networked fBS devices into a connectivity map (described above). The connectivity map can then be utilized by network processor 522 to direct soft hand-off and/or multi-hop routing as described herein.

Figure 6:
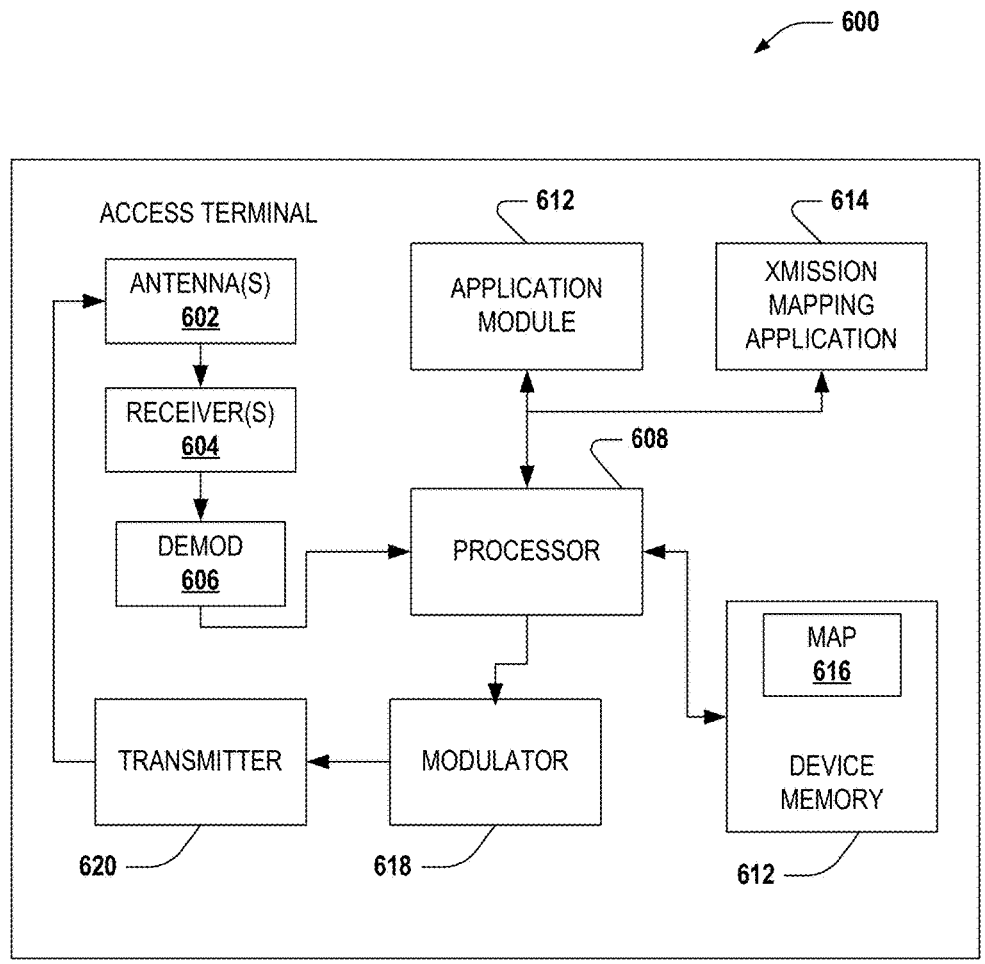
FIG. 6 illustrates a sample mobile device such as the one described in FIGS. 3 and 4.

FIG. 6 illustrates a sample mobile device such as the one described in FIGS. 3 and 4 that can interface with an fBS network for cellular access in accordance with one or more embodiments. Mobile device 600 includes at least one antenna 602 (e.g., a transmission receiver or group of such receivers comprising an input interface) that receives a signal (e.g., containing information related to a data link between a first fBS and mobile device 600) and at least one receiver 604 that performs typical actions (e.g., filters, amplifies, down-converts, etc.) on the received signal. Specifically, antenna(s) 602 can receive information from one or more cellular base stations or fBSs (not depicted), as described herein, to participate in a communication link with such devices. For example, the antenna(s) 602 can receive a connectivity map from an fBS or a cellular network component that provides contemporaneous indication of transmission quality at various fBS access points in range of the antenna(s) 602.

Antenna 602 and receiver 604 can also be connected to a demodulator 606 that can demodulate received symbols and provide them to a processor 608 for evaluation. Processor 608 can be a general purpose processor dedicated to analyzing information received by antenna(s) 602 and/or generating information for transmission by a transmitter 620. Additionally, processor 608 can control one or more components of mobile device 600, and/or analyze information received by antenna(s) 602, generate information for transmission by transmitter 620, and control one or more components of mobile device 600. Additionally, processor 608 can access an application module 612 stored in device memory 610 to execute instructions for directing an fBS device to route traffic to other networked fBS devices (e.g., where at least one of the other networked fBS devices is dedicated to carrying traffic associated with mobile device 600). As a result, processor 608 can facilitate cellular hand-off in an fBS network environment.

In addition to the foregoing, processor 608 can include instructions to forward received data to one or more fBS devices within data that is broadcast by transmitter 620 (e.g., either directly or by way of another fBS). For instance, processor 608 can facilitate broadcasting a second portion of cellular traffic that can be received by at least a second fBS dedicated to carry such traffic for the mobile device 600 (e.g., by determining that the second fBS is in range of the mobile device 600). Alternatively, processor 608 can direct the second portion of data to be transmitted to a third fBS and direct the third fBS to route the data to the second fBS (e.g., by way of the instructions included within the broadcast data). Instructions can be generated based on contemporaneous transmission parameters associated with the fBS devices.

Mobile device 600 can additionally comprise device memory 610 that is operatively coupled to processor 608 and that can store data to be transmitted, received, and the like. Furthermore, memory 610 can store application modules for mobile device 600. Application module 612 and transmission mapping application 614 can be two such modules stored within device memory 610 (see below).

It will be appreciated that a data store (e.g., device memory 610) described herein can be either volatile memory or nonvolatile memory, or can include both volatile and nonvolatile memory. By way of illustration, and not limitation, nonvolatile memory can include read only memory (ROM), programmable ROM (PROM), electronically programmable ROM (EPROM), electronically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory (e.g., device memory 610) of the subject systems and methods is intended to comprise, without being limited to, these and any other suitable types of memory.

Application module 612 can be stored in device memory 610 and configured to generate instructions for an fBS to route cellular traffic to neighboring fBSs. For instance, the application module 612 can access data store in memory (610) and identify an fBS affiliated with mobile device 600. An instruction can be generated and sent (e.g., by processor 608, modulator 618 and/or transmitter 620) to the fBS network identifying the affiliated fBS device and requesting traffic be forwarded to such device for transfer to a cellular network. In addition, routing instructions can be generated by application module 612 based on contemporaneous transmission parameters of one or more fBSs in the fBS network (e.g., determined by transmission mapping application 614). Particularly, application module 612 can reference the transmission parameters and determine a most efficient route to direct traffic from a receiving fBS to the affiliated fBS.

Also stored in device memory 610 is a transmission mapping application 614. The transmission mapping application 614 can be configured to monitor propagation, load, QoS, availability, power consumption, or interference parameters, or a combination of these or like parameters, associated with wireless communication between mobile device 600 and an fBS network. For instance, transmission mapping application 614 can monitor transmission information received at antenna 602 and/or sent by transmitter 620, determine parameters pertinent to mobile device 600, and compile a transmission map 616 based on the monitored parameters. In addition, the transmission mapping application 614 can generate queries that can be forwarded to one or more fBS devices in the fBS network. Responses to such queries can be utilized to modify the transmission map 616 to include transmission information pertaining to various fBS devices. Alternatively, or in addition, a query can be sent to an fBS aggregator to receive transmission information related to the fBS network compiled at an associated cellular network. Further, the transmission map 616 can be updated periodically to create a dynamic map indicating contemporaneous transmission characteristics. The transmission map 616 can then be referenced to determine suitable fBS access points based on such dynamic parameters.

Mobile device 600 still further comprises a modulator 618 and a transmitter 620 that transmits a signal (e.g., including a transmission data packet) for instance, to a base station (e.g., fBS or group of fBSs), an access point, another mobile device, a remote agent, etc. Although depicted as being separate from the processor 608, it is to be appreciated that application module 612 and transmission mapping application 614 can be part of processor 608 or a number of processors (not shown), stored in cache memory, for instance.

Figure 7:
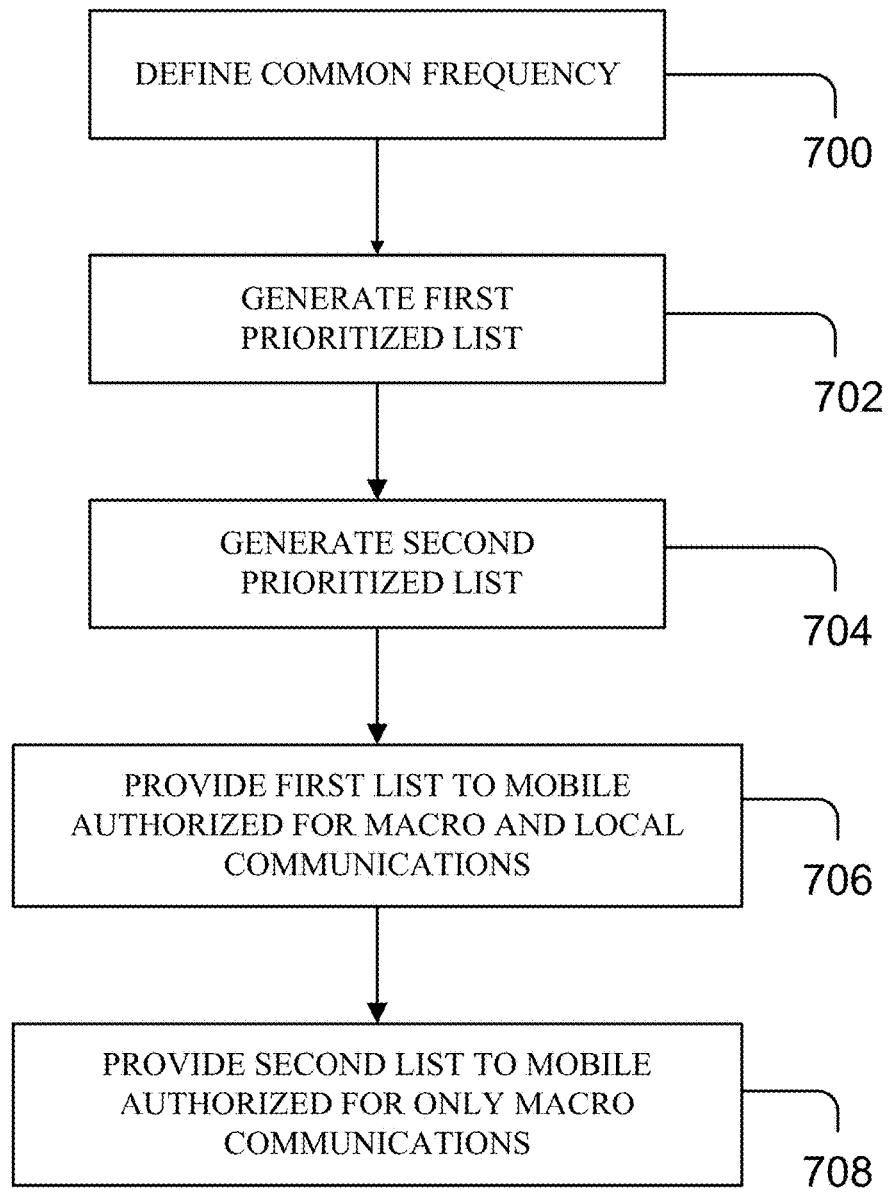
FIG. 7 is a flow diagram illustrating a method for assigning frequencies to mobile devices operating in coexisting communication systems.

FIG. 7 is a flow diagram illustrating a method for a system operator to assign frequencies to mobile devices operating in coexisting communication systems, such as a macro cell mobile network 100 and a localized communication system 200. The steps shown in FIG. 7 may be accomplished using the hardware shown in FIG. 11, although one skilled in the art will readily understand that many other hardware and/or software configurations could be defined to implement the process of FIG. 7.

In step 700, at least one common frequency is defined that is used by both the macro communication system 100 and the localized communication system 200. In step 702, a first prioritized list of related frequency and network identification information is generated by a system operator. The first prioritized list comprises at least two entries; a first entry relating to the macro communication system 100 and the second entry relating to the localized communication system 200. The first and second entries each list the common frequency, as shown in FIG. 8a. Next, as shown in step 704, a second prioritized list of related frequency and network identification information is generated, the second prioritized list comprising at least one entry relating to the macro communication system 100 and no entries relating to the localized communication system 200. In step 706, the first prioritized list is provided to a first mobile device authorized to communicate using either the macro communication system or the localized communication system, and in step 708, the second prioritized list is provided to a second mobile device, the second mobile device not authorized to communicate using the localized communication system. Of course, the system operator generally will provide the first and second lists to many mobile devices, some of which are authorized to communicate with either macro communication system 100 or localized communication system 200, and some only authorized to communicate with the macro communication system 100.

Prioritized lists are well-known in the art for allowing a mobile terminal or UE to select the best communication option from any network/sub-network available to it in a current operating area according to the strategy specified, generally, by roaming business rules. A PRL is typically provided to a mobile terminal either during a provisioning state or updated over the air by a user of the mobile device. The prioritized list is typically a file that is stored in a portion of memory in a mobile device.

The aforementioned prioritized list generally comprises entries of frequencies and associated network and/or sub-network identification information, each entry having a priority code assigned to it. The priority codes instruct mobile devices to use an associated network/sub-network and/or frequencies based, typically, on costs of operation on any particular network. The prioritized list generally contains information pertaining to one or more macro communication systems (i.e., a CDMA system operated by Verizon Wireless, a CDMA system operated by Sprint Communications, a TDMA system operated by T-Mobile Communications, or a GSM system operated by AT&T, etc) using well-known SID/NID codes.

As mentioned above, a system operator wishing to implement the shared frequency concept will provide one type of prioritized list to mobile devices having dual-system capabilities (i.e., macro system and femtocell) and another type to mobile devices that are forbidden from accessing femtocells. A first type of prioritized list that is provided to mobile devices having dual-system capabilities is shown in FIG. 8a while FIG. 8b shows a simplified prioritized list that is provided to mobile devices prohibited from accessing femtocells associated with the shared frequency identified in the prioritized list of FIG. 8a.

The prioritized list of FIG. 8a comprises information pertaining to at least one localized communication system (such as a femtocell), i.e., frequency information, network/system identifiers (SID/NID codes), priority numbers, etc. In particular, FIG. 8a shows three entries, each entry having a frequency column, a network/sub-network identifier column, and a priority column. Other information that may be included in a prioritized list pertaining to this first embodiment has been omitted for clarity. It should be understood that the prioritized list may have a greater, or fewer, number of entries than that shown in FIG. 8a. It should also be understood that the identifier column typically lists well-known SID/NID codes identifying particular communication systems and their sub-systems or networks. For example, in FIG. 8a, $SID_M/NID_{M1}$ might represent a network ($NID_{M1}$) in a CDMA communication system operated by Verizon Wireless ($SID_M$) while $SID_M/NID_{M2}$ might represent a second network operating in the same CDMA communication system operated by Verizon Wireless. The $SID_M/NID_F$ represents a localized communication system, such as a femtocell. It should be understood that in other variations of FIG. 8a, there could be more than one macro cell mobile network defined.

The frequency column lists one or more frequencies in which the mobile terminal will to hash to. The frequencies are typically used to communicate system overhead information to/from mobile devices. For example, the frequencies listed in FIGS. 8a and 8b may represent frequencies relating to a paging channel. The mobile device will generally hash to one of the frequencies listed in the prioritized list to listen for a page directed to the particular mobile terminal. The page typically includes frequency and/or channel information for the mobile device to use during an active communication, such as for transmitting and receiving voice or data. The frequency used by the mobile device during periods of active communications may be different than any of the frequencies listed in the prioritized list. When the active communication session is over, the mobile device will generally hash to one of the frequencies listed in the prioritized list.

Referring back to FIG. 8a, entry number 3 shows four possible frequencies to hash to if the mobile terminal is currently operating within a coverage area defined by $SID_M/NID_{M1}$ and the mobile device is not in range of any other communication systems. If, however, the mobile terminal determines that it is in the operating range of both $SID_M/NID_{M1}$ and $SID_M/NID_{M2}$, the priority indicators would dictate that the mobile terminal hash to frequency F5 belonging to $SID_M/NID_{M2}$, rather than $SID_M/NID_{M1}$. Similarly, if the mobile terminal is in the operating range of $SID_M/NID_{M1}$, $SID_M/NID_{M2}$, and $SID_M/NID_F$, the priority indicators would dictate that the mobile device hash to frequency F5 belonging to $SID_F/NID_{M2}$, defining a femtocell within range of the mobile device.

It should be noted that in FIG. 8a, frequency F5 is listed as an available hash-to frequency for both the macro communication system (defined by $SID_M/NID_{M2}$) and a femtocell (defined by $SID_F/NID_{M2}$). However, it should also be noted that the priority for frequency F5 is a higher "1" for the femtocell while being a lower priority "2" for the macro communication system. What this means is that if the mobile terminal is operating in an area in which both the macro communication system and the femtocell are available, the mobile terminal will generally select entry number one, hash to frequency F5, and monitor/use one or more communication channels associated with the femtocell. If, however, the mobile terminal was operating in an area covered by a macro communication system defined by $SID_M/NID_{M1}$ and a macro communication system defined by $SID_M/NID_{M2}$, the mobile would select entry number 2 (based on priority), hash to frequency F5 (the same frequency used by the femtocell), but monitor/use one or more channels associated with a macro communication system (i.e., a base station associated with a macro communication system).

In a slight variation of the first embodiment, again using FIG. 8a, a mobile terminal may first select entry number two (based on currently available networks and the priority level), monitoring a macro communication system over frequency F5. If the mobile terminal next moves in range of a femtocell also operating on frequency F5, the mobile terminal may switch to communications using the femtocell by using well-known Idle HandOff principles such as BSR. For example, the mobile terminal may switch to the femtocell if a PSMM signal indicates that a pilot signal from the femtocell exceeds a certain threshold.

In another embodiment, when a mobile device is monitoring the shared frequency, the mobile device may receive a beacon, or pilot signal, that may support sync and paging as well. The beacon conveys information pertaining to the existence of a femtocell within range of the mobile device. The beacon is transmitted in the same footprint as the femtocell over a channel other than the channel of the femtocell operation, typically coinciding with the macro channel of operation. In this case, while monitoring the shared frequency (F5 in this case) in a macro mode of communications (i.e., using communication protocols in accordance with the macro cell mobile system 100), the mobile device receives a beacon from a femtocell over frequency F5. In another embodiment, the mobile device may receive the beacon while monitoring other one or more frequencies other than the shared frequency. The beacon comprises of a Pilot, Sync, and Paging channels that allows the mobile to be redirected to the femto channel of operation, allowing the mobile to acquire the femtocell. When a mobile device detects a pilot signal from a beacon in excess of a predetermined threshold, the mobile performs an Idle Handoff to the beacon and is mandated to read the overhead information transmitted by the beacon as with any newly acquired pilot. In one embodiment, a CCLM message (CDMA Channel List Message) is received by the mobile device over the paging channel. In another embodiment, a GSRDM/SRDM message ((Global)Service Redirection Message) is received. These messages are used by the mobile device to move the mobile to a frequency specified in the message, i.e., to a frequency used by the femtocell.

Figure 9A:
FIGS. 9a and 9b illustrate alternative, exemplary, prioritized lists used in one embodiment.
Figure 9B:
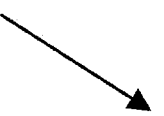

FIGS. 9a and 9b illustrate exemplary prioritized lists used in the embodiment just discussed above. In FIG. 9a, table 900 illustrates one arrangement of the prioritized list, showing frequencies F5 and F6 as belonging to the same femtocell and having a priority of "1", i.e., the highest priority. In another, alternate, arrangement, FIG. 9b shows table 902 frequency F5 as belonging to the macro cell mobile network 100 and having a priority of "1", while frequency F6, belonging to the localized communication system or femtocell, is shown as also having the highest priority. In another arrangement, F6 is not listed in the prioritized list.

FIG. 8b shows a prioritized list that is provided to mobile devices that are not permitted to access a femtocell that operates on the designated shared frequency, in this case, frequency F5. It should be understood that a greater number of entries could be defined in the prioritized list of FIG. 8b. In addition, each entry in the prioritized list of FIG. 8b may contain a greater, or fewer, number of frequencies. In this case, only one entry is shown, listing frequencies F2, F2, F3, and F4 pertaining to $SID_M/NID_{M1}$ (although, in other examples, the prioritized list may comprise more than one entry, each entry having one or more hash-to frequencies pertaining to the same or other macro cell networks). Mobile terminals that have been provided the list of FIG. 8b will hash to one of the frequencies listed in the prioritized list based on the available networks and/or sub-networks in its current operating area and a priority level associated with each entry in the prioritized list. A system operator provides the prioritized list of FIG. 8a to mobile devices having dual-system permission and the prioritized list of FIG. 8b to mobile devices not having dual-system permission.

It should be understood that a system operator may have many variations of the prioritized lists shown in FIGS. 8a, 8b, 9a, and 9b to be provided to a number of different wireless devices. For example, a system operator may define a number of prioritized lists like the one shown in FIG. 8a, each list identifying one or more frequencies dedicated as a shared channel. The shared frequency(s) listed in one of the prioritized lists may be the same or different than shared frequencies defined in other lists. In addition, a system operator may define any number of prioritized lists like the one shown in FIG. 8b, each list designating only macro cell frequencies available to mobile devices. Each of these lists may have a different number of entries and different number of frequencies defined for each entry.

Figure 10:
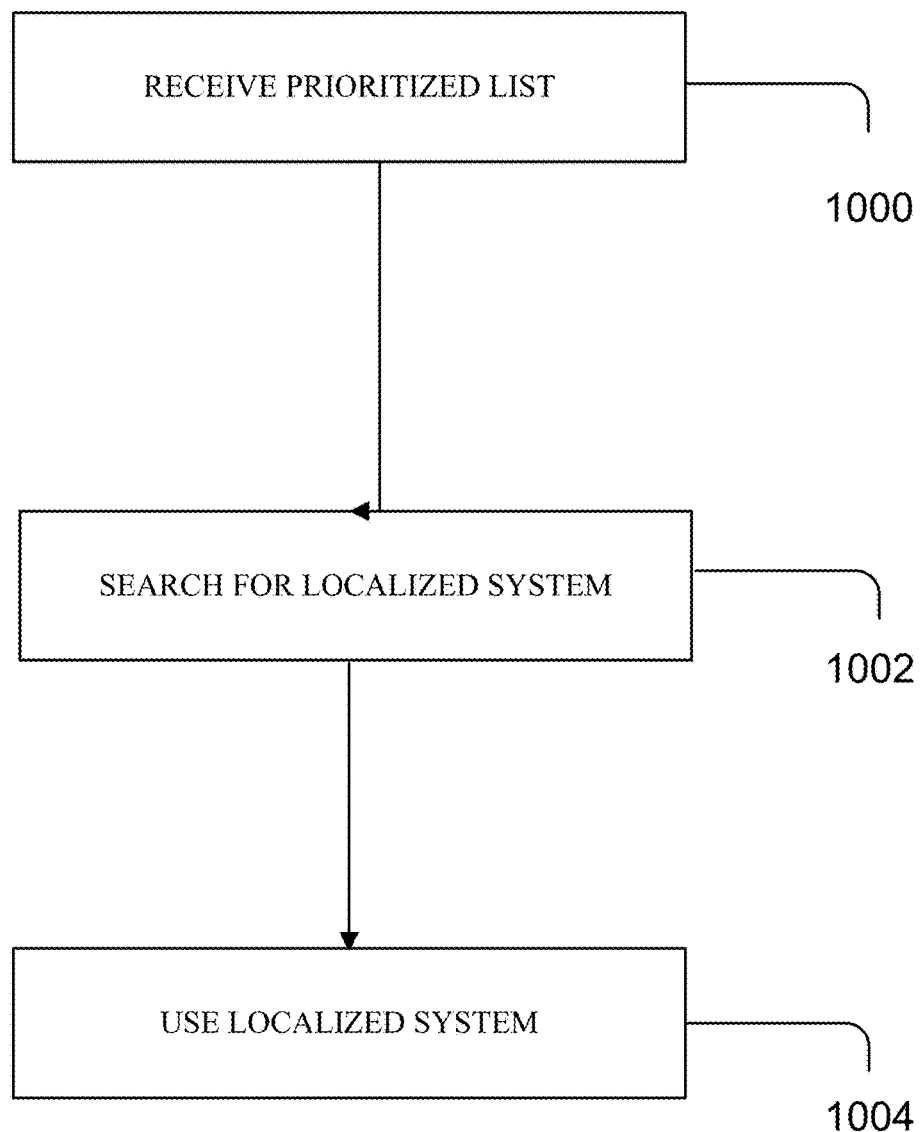
FIG. 10 illustrates a flow diagram illustrating a method for efficient frequency assignment for a mobile terminal assignment.

FIG. 10 illustrates a flow diagram of an embodiment for efficient frequency assignment for mobile terminals in coexisting wireless communication systems, comprising a macro communication system and a femtocell. References to a mobile terminal will be associated with FIG. 6.

In step 1000, a prioritized list is received by receiver 604, for example, in a mobile terminal 600 able to communicate over a macro network and a femtocell and, in this example, has information stored therein as shown in FIG. 8a. The prioritized list comprises information relating to at least one macro communication system and a femtocell. For example, in FIG. 8a, the third entry comprises multiple frequency indicators (representing a number of frequencies that the mobile device may hash to), a third network/sub-network identifier associated with the multiple frequency indicators, and a third priority indicator. A second entry might comprise a second frequency indicator (more than one may be defined), a second network/sub-network identifier, and a second priority indicator, the second entry corresponding to the macro network. The first entry comprises the second frequency indication, a first network and/or sub-network identifier, and a first priority indicator, the third entry corresponding to the femtocell. It should be understood that the second frequency is used by both the macro communication system and the femtocell and is referred to herein as a common frequency. Typically, a macro communication system planning effort assigns frequencies to the various base stations and femtocells belonging to a particular service provider and, in such a case, the common frequency between the macro communication system and the femtocell is pre-arranged. In other embodiments, it might be coincidental that a femtocell and a macro communication system use the same frequency.

In any case, the prioritized list is received by a mobile device able to communicate over the macro communication system or the femtocell, shown as step 1000. The prioritized list may be saved in memory device 612. The prioritized list may be provisioned at the time of manufacture of the wireless device or it may be provided at any other time. For example, a prioritized list may be provided over-the-air to a wireless device upon a user of the wireless device entering a predetermined feature code, such as *228. Alternatively, the prioritized list may be provided to the wireless device by using a cable connected between a computer and the wireless device to directly download the prioritized list into the wireless device.

After the prioritized list is received, the processor 608 will search for the localized communication system on the common frequency while using the common frequency to communicate with the first macro communication system, shown as step 1002. In step 1004, at least processor 608 and transmitter 620 are used to communicate with the localized communication system using the common frequency when the localized communication system is determined to be in range.

Other possible actions taken by a mobile terminal 600 in relation to the process shown in FIG. 10 are described as follows. Once the prioritized list has been provided to the wireless device, the wireless device may determine, at some point, one or more available networks within range of the mobile terminal using techniques generally known to those skilled in the art. For example, in FIG. 6, this could be accomplished by a combination of receiver 604, processor 608, and device memory 612. With respect to FIG. 3, it could be accomplished using location determination unit 316 (as well as a processor and a memory inherent in mobile terminal 600).

Processor 608 will select a frequency to use and a communication type (i.e., macro or femto) based on the available networks within range of the mobile terminal and the priority indicators contained within the prioritized list as stored in device memory 612. For example, if two networks are within range of the mobile device, the mobile device will consult the prioritized list to determine which of the two networks it is allowed to use (if any) and, if both networks are allowed, which network has been assigned a higher priority. The mobile device will then generally hash to one of the frequencies listed in the prioritized list belonging to the selected system/sub-system. If one of the systems/sub-systems found by the mobile device comprises the shared frequency F5, the mobile will begin monitoring F5. In one embodiment, the mobile device monitoring frequency F5 does so using protocols in accordance with macro cell mobile network 100. In another embodiment, the mobile device discovers a femtocell transmitting on frequency F5 and so begins monitoring frequency F5 in accordance with protocols associated with the femtocell or localized communication system 200.

In the embodiment in which the mobile device is monitoring the shared frequency F5 and communicating with the macro cell mobile network 100, the mobile device may attempt to find a femtocell or localized communication system 200 (or a femtocell beacon) within range of the wireless device using well-known handoff techniques, such as BSR or typical idle handoff procedures. This is accomplished by using processor 608 in combination with codes stored within device memory 612 for performing the above action. Advantageously, the mobile device continues to use the shared frequency F5 to search for a localized communication system thereby eliminating the need to switch frequencies to search for a femtocell.

When a femtocell is discovered, the mobile device will continue to monitor/use frequency F5, however it will begin to communicate with the femtocell, rather than the macro cell mobile network 100, due to the higher priority level (priority 1) of the femtocell listed in the prioritized list.

In another embodiment, there may be cases in such a coexisting communication system as described above in which a mobile terminal may be actively participating in a communication with the macro cell mobile network 100 on one particular frequency and receive interference from a localized communication system 200, or femtocell, operating on the same frequency. In this case, it is not desirable or perhaps even possible to transfer a communication in progress from the macro cell mobile network 100 to a femtocell. For example, the mobile terminal may be unauthorized or physically unable to communicate with a localized communication system, or the particular localized communication system may be off limits to the particular mobile terminal.

In any case, a mobile terminal, such as mobile terminal 600, may be engaged in a first active communication with the macro communication system using a first frequency that is common to both the macro communication system and the localized communication system, as described earlier. The mobile terminal may experience high levels of interference if it is located near a second mobile terminal or a femtocell operating on the common frequency. The mobile terminal will detect and measure the interference level, based on techniques well-known in the art, and compare the measured interference exceeds a predetermined threshold. For example, the mobile terminal of FIG. 6 might use processor 608 in conjunction with receiver 604, device memory 612 in order to perform the measurement and comparison.

If the measured interference exceeds the predetermined threshold, the mobile terminal transmits an indication of this event to the macro cell mobile network 100 using, for example, transmitter 620. In another embodiment, the mobile terminal simply transmits the measured interference level to the macro cell mobile network 100 without determining whether the interference level exceeds a predetermined threshold. In this case, the comparison is done at the macro infrastructure, for example, by a processor located within the macro cell mobile network 100.

The mobile terminal will then receive instructions, via receiver 604, to transfer the active communication to a second macro frequency based on the interference level exceeding the predetermined threshold. This is generally accomplished by processor 608 transferring the communication in progress to a different frequency using techniques well-known in the art. The instructions to move the active communication to a second frequency are generally provided by network equipment located within mobile operator core network 250 after being alerted by the mobile device that an interference level has been exceeded in the current frequency of operation. However, in another embodiment, the mobile terminal may have such instructions predetermined and stored within device memory 612.

Figure 11:
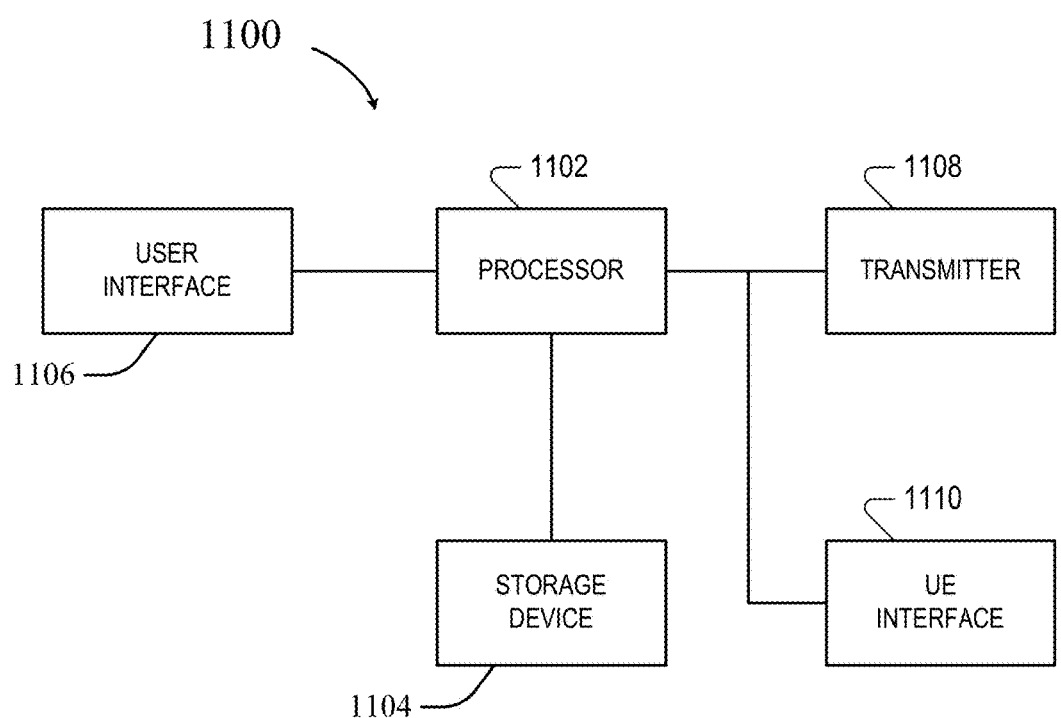
FIG. 11 illustrates a system operator facility for assigning frequencies to mobile devices operating in coexisting communication systems.

FIG. 11 illustrates a hardware system used by a macro system operator for assigning frequencies to mobile devices operating in coexisting communication systems. Shown is system 1100, comprising processor 1102, storage device 1104, user interface 1106, transmitter 1208, and UE interface 1110. It should be understood that all of the components shown in FIG. 11 are not necessary for a system operator to assigning frequencies to mobile devices operating in coexisting communication systems. Some of the components are shown as they would appear in various embodiments of system 1100.

System 1100 generally comprises a user interface 1106 that receives information from a macro system operator to define at least one frequency common to the macro communication system and a localized communication system, such as a femtocell. In another embodiment, user interface 1106 comprises hardware and/or software to connect to a computer that performs various macro system calculations, generally in regard to system-wide properties, such as frequency allocation, roaming lists, base station information, etc. In either case, the common frequency is generally chosen in accordance with system-wide planning principles and generally requires information relating to at least one femtocell, such as the operating frequency of the femtocell.

The processor 1102 receives the common frequency information from the user interface and generates a first prioritized list of related frequency and network identification information, the first prioritized list comprising at least two entries. The first entry relates to the first macro communication system and the second entry relates to the localized communication system. The first and second entries each list the at least one common frequency. An example of such a list is illustrated in FIG. 8a. The processor 1102 may, in addition, use information stored in storage device 1104 to generate the first prioritized list.

Processor 1102 also generates a second prioritized list of related frequency and network identification information, the second prioritized list comprising at least one entry relating to the first macro communication system and no entries relating to the localized communication system. An example of such a list is shown in FIG. 8b. Again, processor 1102 may use information stored in storage device 1104 to generate the second prioritized list.

The first list is provided to mobile terminals authorized to communicate with the macro communication system or the localized communication system. This may be accomplished by providing the list to UE Interface 1110, generally used during the provisioning stage of mobile terminal production, where mobile terminals are initially provided programming information so that they by be usable when purchased by consumers. UE Interface 1210 comprises any well-known interface between processor 1202 and a mobile terminal in the provisioning stage of production.

In addition to UE Interface 1110, or alternatively, the first list may be provided over-the-air to a mobile terminal using transmitter 1108. This is a well-known technique for provided information over-the-air to a mobile terminal upon a user of the wireless device entering a predetermined feature code, such as *228.

The second list is provided to a mobile terminal that is not authorized to communicate using the localized communication system. The second list is provided to the non-authorized mobile terminal in either, or both, of the ways mentioned previously using transmitter 1108 and/or UE interface 1110.

Figure 12:
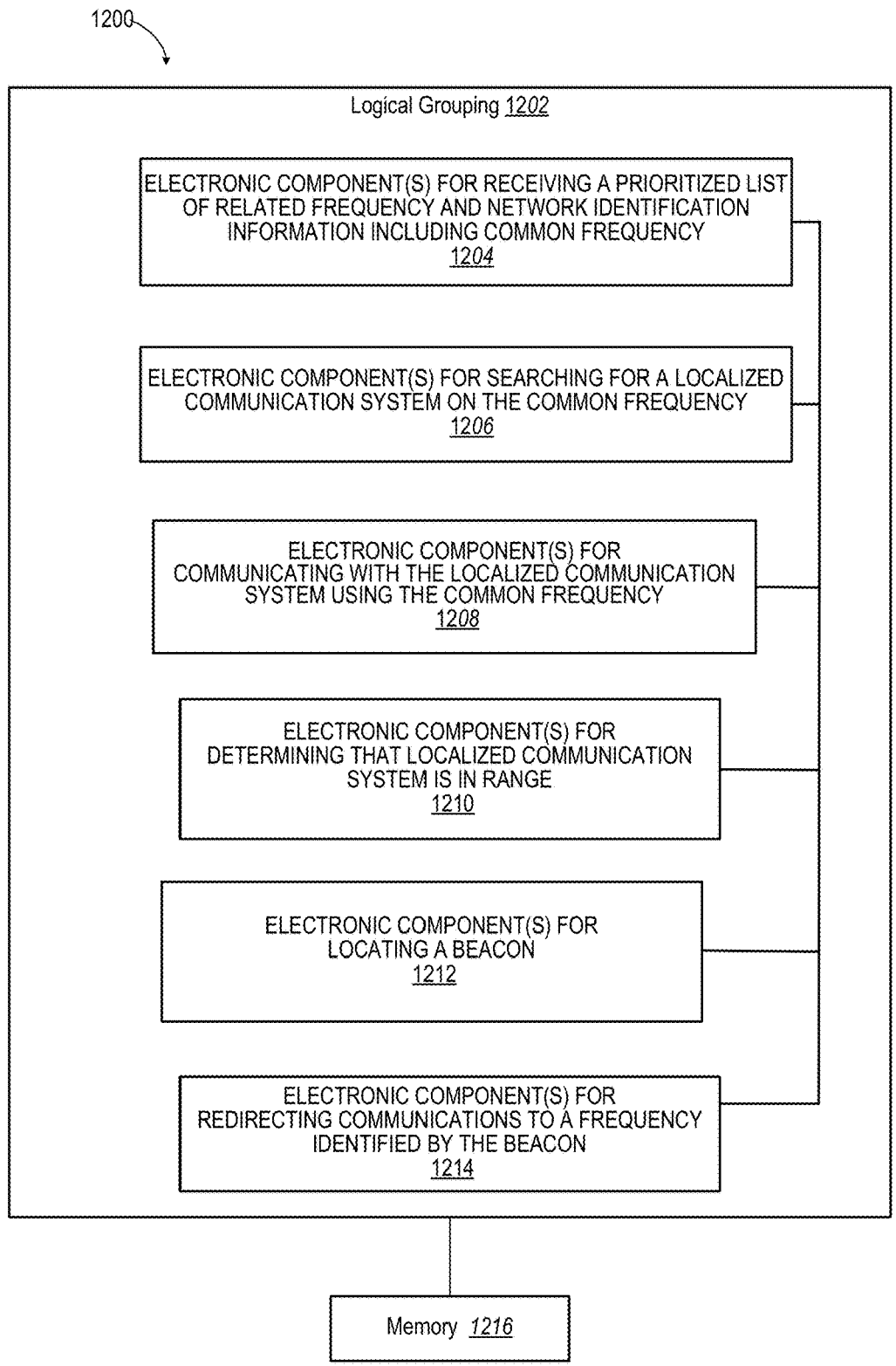
FIG. 12 illustrates an apparatus for frequency assignment to mobile terminals in coexisting communication systems used in a mobile terminal.

FIG. 12 illustrates an apparatus 1200 for frequency assignment to mobile terminals in coexisting communication systems. Apparatus 1200 generally resides at least partially within user equipment (UE). It is to be appreciated that apparatus 1200 is represented as including functional blocks, which can be functional blocks that represent functions implemented by a computing platform, processor, software, or combination thereof (e.g., firmware). It should also be understood that not all of the functional blocks shown in FIG. 12 may be necessary for implementing various aspects of the various embodiments discussed herein.

Apparatus 1200 includes a logical grouping 1202 of electronic components that can act in conjunction. For instance, logical grouping 1202 can include one or more electronic components 1204 for receiving a prioritized list of related frequency and network identification information, the prioritized list comprising at least two entries, a first entry relating to a first macro communication system and a second entry relating to a localized communication system, the first and second entries each listing at least one common frequency. Apparatus 1200 additionally includes one or more electronic components 1206 for searching for the localized communication system on the common frequency while using the common frequency to communicate with the first macro communication system. Finally, apparatus 1200 includes one or more electronic components 1208 for communicating with the localized communication system using the common frequency when the localized communication system is determined to be in range.

Apparatus 1200 may additionally include one or more electronic components 1210 for determining that a localized communication system is within range of a wireless terminal. In addition, apparatus 1200 may comprise one or more electronic components 1212 for locating a beacon from the localized communication system, and one or more electronic components 1214 for redirecting communications to a frequency identified by the beacon, the frequency associated with the localized communication system. Finally, apparatus 1200 may include a memory 1216 that retains instructions for executing functions associated with electronic components 1204-1214. While shown as being external to memory 1216, it is to be understood that the one or more electronic components 1204-1214 can exist within memory 1216.

Figure 13:
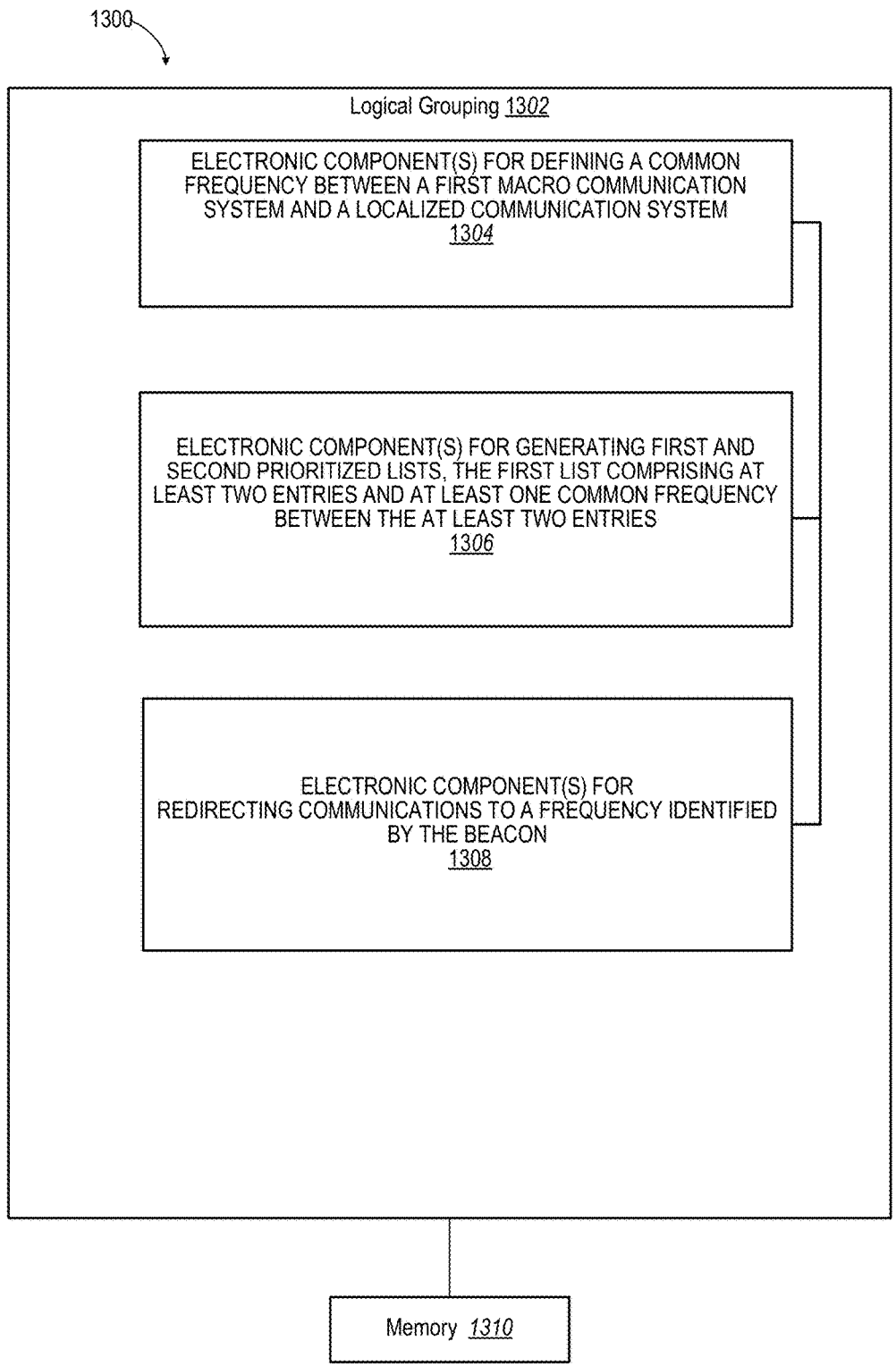
FIG. 13 illustrates an apparatus for frequency assignment to mobile terminals in coexisting communication systems used by a macro system operator.

FIG. 13 illustrates an apparatus for frequency assignment to mobile terminals in coexisting communication systems used by a macro system operator. Apparatus 1300 generally resides at least partially within mobile operator core network 250. It is to be appreciated that apparatus 1300 is represented as including functional blocks, which can be functional blocks that represent functions implemented by a computing platform, processor, software, or combination thereof (e.g., firmware). It should also be understood that not all of the functional blocks shown in FIG. 13 may be necessary for implementing various aspects of the various embodiments discussed herein.

Apparatus 1300 includes a logical grouping 1302 of electronic components that can act in conjunction. For instance, logical grouping 1302 can include one or more electronic components 1304 for defining a common frequency to be used by a first macro communication system and a localized communication system. Apparatus 1300 further includes one or more electronic components 1306 for generating a first prioritized list of related frequency and network identification information, the first prioritized list comprising at least two entries, a first entry relating to the first macro communication system and the second entry relating to the localized communication system, the first and second entries each listing the common frequency, and for generating a second prioritized list of related frequency and network identification information, the second prioritized list comprising at least one entry relating to the first macro communication system and no entries relating to the localized communication system. Apparatus 1300 further includes one or more electronic components 1308 for providing the first prioritized list to a first mobile device authorized to communicate using either the first macro communication system or the localized communication system, and for providing the second prioritized list to a second mobile device, the second mobile device not authorized to communicate using the localized communication system. Finally, apparatus 1300 may include a memory 1310 that retains instructions for executing functions associated with electronic components 1304-1308. While shown as being external to memory 1310, it is to be understood that the one or more electronic components 1304-1308 can exist within memory 1310.

Figure 14:
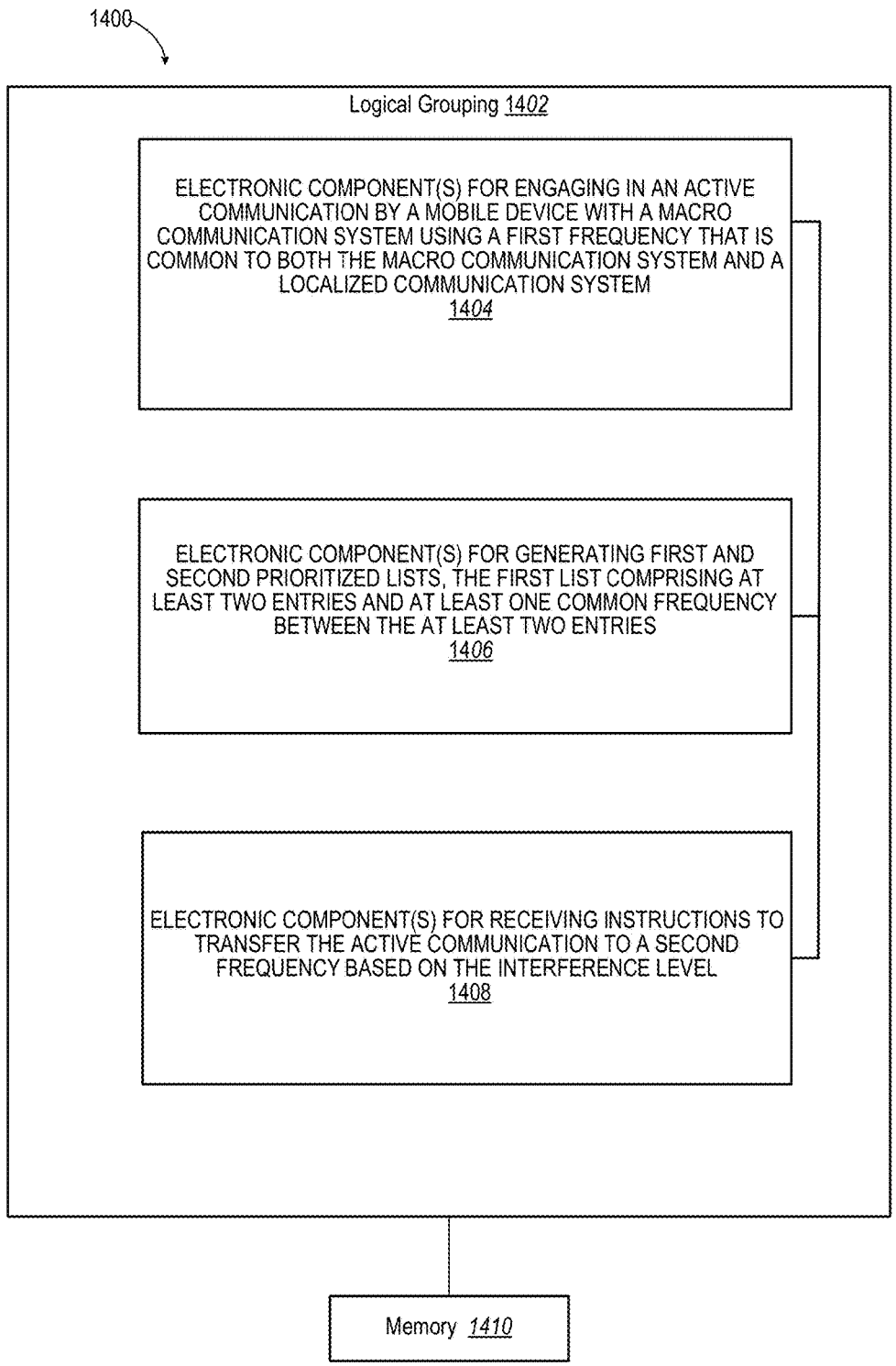
FIG. 14 illustrates another embodiment of an apparatus for frequency assignment to mobile terminals in coexisting communication systems.

FIG. 14 illustrates another embodiment of an apparatus for frequency assignment to mobile terminals in coexisting communication systems. Apparatus 1400 generally resides at least partially within user equipment (UE). It is to be appreciated that apparatus 1400 is represented as including functional blocks, which can be functional blocks that represent functions implemented by a computing platform, processor, software, or combination thereof (e.g., firmware). It should also be understood that not all of the functional blocks shown in FIG. 14 may be necessary for implementing various aspects of the various embodiments discussed herein.

Apparatus 1400 includes a logical grouping 1402 of electronic components that can act in conjunction. For instance, logical grouping 1402 can include one or more electronic components 1404 for engaging in an active communication by a mobile device with a macro communication system using a first frequency that is common to both the macro communication system and a localized communication system. Apparatus 1400 further comprises one or more electronic components 1406 for detecting interference greater than a predetermined threshold, the interference originating from the localized communication system. Apparatus 1400 further comprises one or more electronic components 1408 for receiving instructions to transfer the active communication to a second frequency based on the interference level. Finally, apparatus 1400 may include a memory 1410 that retains instructions for executing functions associated with electronic components 1404-1408. While shown as being external to memory 1410, it is to be understood that the one or more electronic components 1404-1408 can exist within memory 1410.

While the specification describes particular examples of the present invention, those of ordinary skill can devise variations of the present invention without departing from the inventive concept. For example, the teachings herein refer to circuit-switched network elements but are equally applicable to packet-switched domain network elements.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

We claim:

1. A method operable by a mobile device, comprising:
   receiving, from one or more of a first communication system and a second communication system, first geographic coordinates defining a geographic location of the first communication system, second geographic coordinates defining a geographic location of the second communication system, and priority indicators indicating the respective priorities of the first communication system and the second communication system, wherein the first communication system and the second communication system are each associated with a common frequency channel;
   determining that the first communication system and the second communication system are both in range of the mobile device, based on the first geographic coordinates and the second geographic coordinates;
   selecting, based on the priority indicators, a highest-priority communication system from a group comprising the first communication system and the second communication system;
   communicating with the highest-priority communication system on the common frequency channel;

measuring interference on the common frequency channel at the mobile device;

transmitting interference data to the highest-priority communication system; and receiving one or more instructions to communicate on a different frequency channel that is different from the common frequency channel.

2. The method of claim 1, wherein the receiving of the first geographic coordinates, second geographic coordinates, and priority indicators comprises receiving a prioritized list comprising the first geographic coordinates, second geographic coordinates.

3. The method of claim 2, wherein the prioritized list further comprises a system identification/network identification (SID/NID) code for each of the first communication system and the second communication system.

4. The method of claim 2, wherein one or more of the first communication system and the second communication system is a first macro communication system, and the prioritized list further comprises data relating to a second macro communication system, the second macro communication system having lower priority than the first communication system and the second communication system.

5. The method of claim 1, wherein determining that the first communication system is within range of the mobile device comprises locating a beacon from the first communication system, and redirecting communications to a frequency identified by the beacon.

6. An apparatus, comprising a processor coupled to a memory, the memory holding program instructions that when executed by the processor, cause the apparatus to perform:

receiving, from one or more of a first communication system and a second communication system, first geographic coordinates defining a geographic location of the first communication system, second geographic coordinates defining a geographic location of the second communication system, and priority indicators indicating the respective priorities of the first communication system and the second communication system, wherein the first communication system and the second communication system are each associated with a common frequency channel;

determining that the first communication system and the second communication system are both in range of the mobile device, based on the first geographic coordinates and the second geographic coordinates;

selecting, based on the priority indicators, a highest-priority communication system from a group comprising the first communication system and the second communication system;

communicating with the highest-priority communication system on the common frequency channel;

measuring interference on the common frequency channel at the mobile device;

transmitting interference data to the highest-priority communication system; and receiving one or more instructions to communicate on a different frequency channel that is different from the common frequency channel.

7. The apparatus of claim 6, wherein the instructions for receiving of the first geographic coordinates, second geographic coordinates, and priority indicators further comprise instructions for receiving a prioritized list comprising the first geographic coordinates, the second geographic coordinates, and the priority indicators.

8. The apparatus of claim 7, wherein the prioritized list further comprises a system identification/network identification (SID/NID) code for each of the first communication system and the second communication system.

9. The apparatus of claim 7, wherein one or more of the first communication system and the second communication system is a first macro communication system, and the prioritized list further comprises data relating to a second macro communication system having lower priority than the first communication system and the second communication system.

10. The apparatus of claim 6, wherein the instructions for determining that the first communication system is within range of the mobile device further comprise instructions for locating a beacon from the first communication system, and redirecting communications to a frequency identified by the beacon.

11. An apparatus, comprising:

means for receiving, from one or more of a first communication system and a second communication system, first geographic coordinates defining a geographic location of the first communication system, second geographic coordinates defining a geographic location of the second communication system, and priority indicators indicating the respective priorities of the first communication system and the second communication system, wherein the first communication system and the second communication system are each associated with a common frequency channel;

means for determining that the first communication system and the second communication system are both in range of the mobile device, based on the first geographic coordinates and the second geographic coordinates;

means for selecting, based on the priority indicators, a highest-priority communication system from a group comprising the first communication system and the second communication system;

means for communicating with the highest-priority communication system on the common frequency channel;

means for measuring interference on the common frequency channel at the mobile device;

means for transmitting interference data to the highest-priority communication system; and means for receiving one or more instructions to communicate on a different frequency channel that is different from the common frequency channel.

12. A non-transitory computer-readable medium comprising codes for causing a computer to:

receive, from one or more of a first communication system and a second communication system, first geographic coordinates defining a geographic location of the first communication system, second geographic coordinates defining a geographic location of the second communication system, and priority indicators indicating the respective priorities of the first communication system and the second communication system, wherein the first communication system and the second communication system are each associated with a common frequency channel;

determine that the first communication system and the second communication system are both in range of the mobile device, based on the first geographic coordinates and the second geographic coordinates;

select, based on the priority indicators, a highest-priority communication system from a group comprising the first communication system and the second communication system;

communicate with the highest-priority communication system on the common frequency channel;

measure interference on the common frequency channel at the mobile device;

transmit interference data to the highest-priority communication system; and receive one or more instructions to communicate on a different frequency channel that is different from the common frequency channel.

13. The non-transitory computer-readable medium of claim 12, wherein the codes for receiving of the first geographic coordinates, second geographic coordinates, and priority indicators further comprise codes for causing the computer to receive a prioritized list comprising the first geographic coordinates, the second geographic coordinates, and priority indicators.

14. The non-transitory computer-readable medium of claim 12, wherein the prioritized list further comprises comprise a system identification/network identification (SID/NID) code for each of the first communication system and the second communication system.

15. The non-transitory computer-readable medium of claim 12, wherein one or more of the first communication system and the second communication system is a first macro communication system, and the prioritized list further comprises data relating to a second macro communication system, having lower priority than the first communication system and the second communication system.

16. The non-transitory computer-readable medium of claim 12, wherein the codes for causing the computer to determine that the first communication system is within range of the mobile devices further comprises codes for causing the computer to locate a beacon from the first communication system, and redirecting communications to a frequency identified by the beacon.

* * * * *